(12) United States Patent
Takeuchi et al.

(10) Patent No.: US 7,780,430 B2
(45) Date of Patent: Aug. 24, 2010

(54) MANDREL, AND APPARATUS AND PROCESS FOR RESIN FILM PRODUCTION WITH MANDREL

(75) Inventors: Takeshi Takeuchi, Kobe (JP); Shingo Yoshida, Kobe (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 250 days.

(21) Appl. No.: 11/795,380

(22) PCT Filed: Jan. 18, 2006

(86) PCT No.: PCT/JP2006/300631
§ 371 (c)(1),
(2), (4) Date: Jul. 17, 2007

(87) PCT Pub. No.: WO2006/077877
PCT Pub. Date: Jul. 27, 2006

(65) Prior Publication Data
US 2008/0099949 A1    May 1, 2008

(30) Foreign Application Priority Data
Jan. 18, 2005 (JP) ............... 2005-010559
Mar. 29, 2005 (JP) ............... 2005-093679
Mar. 29, 2005 (JP) ............... 2005-096319

(51) Int. Cl.
*A01J 21/02* (2006.01)
*A21C 3/04* (2006.01)
*A23G 1/20* (2006.01)
*D01D 5/24* (2006.01)
*B29C 39/14* (2006.01)
*B29B 15/00* (2006.01)

(52) U.S. Cl. .................... 425/381; 425/378.1; 425/377; 425/403; 425/72.1; 264/209.1; 264/560; 264/565

(58) Field of Classification Search .............. 425/381, 425/378.1, 377, 403, 72.1; 264/209.1, 560, 264/565
See application file for complete search history.

(56) References Cited

U.S. PATENT DOCUMENTS 2,987,765 A *  6/1961  Cichelli ............... 264/565

(Continued)

FOREIGN PATENT DOCUMENTS

JP            50-56453           5/1975

(Continued)

*Primary Examiner*—Matthew J. Daniels
*Assistant Examiner*—Atul Khare
(74) *Attorney, Agent, or Firm*—Smith, Gambrell & Russell, LLP

(57) ABSTRACT

To provide an apparatus and method for producing a resin film product from a thermoplastic resin in a stable manner without damage to the product, wherein the resin film product is thin and has a uniform, flat surface.

A mandrel 7 that comes into proximity or contact with the surface of a moving resin film to guide the movement of the resin film when a resin film in continuous form is continuously produced, the mandrel comprising:
  a mandrel main body 71 having an opening; and
  a guide part 72 that is composed of an elastic member attached to the opening 71a and that can advance and retract relative to the resin film, and
  an apparatus and method for producing a resin film using the mandrel.

16 Claims, 17 Drawing Sheets

U.S. PATENT DOCUMENTS

| | | | |
|---|---|---|---|
| 4,465,649 A | 8/1984 | Johnson | |
| 2006/0240137 A1 * | 10/2006 | Takeuchi et al. | ............ 425/380 |
| 2006/0269642 A1 | 11/2006 | Yoshida et al. | |

FOREIGN PATENT DOCUMENTS

| | | |
|---|---|---|
| JP | 52-2949 | 1/1977 |
| JP | 58-94433 | 6/1983 |
| JP | 58-188626 | 11/1983 |
| JP | 59-120428 | 7/1984 |
| JP | 60-259430 | 12/1985 |
| JP | 4-19123 | 1/1992 |
| JP | 04019123 A * | 1/1992 |
| JP | 5-239229 | 9/1993 |
| JP | 8-267571 | 10/1996 |
| JP | 2000-219752 | 8/2000 |
| WO | 2004/067260 | 8/2004 |
| WO | 2004/067266 | 8/2004 |
| WO | WO 2004067260 A1 * | 8/2004 |

* cited by examiner

[Fig 1]
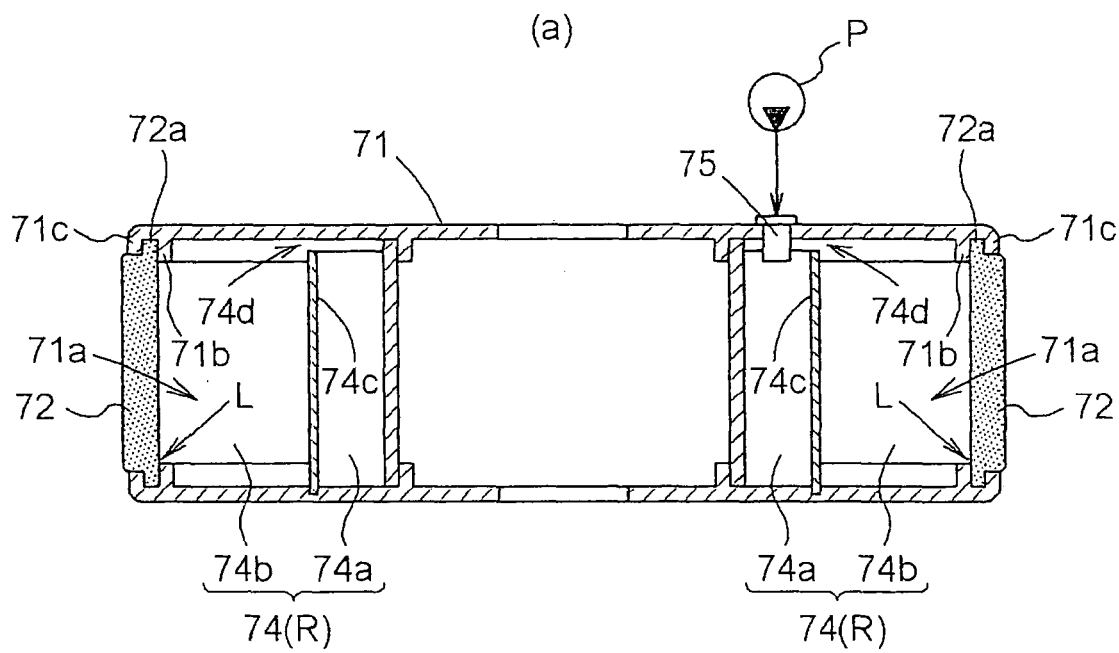
(a)
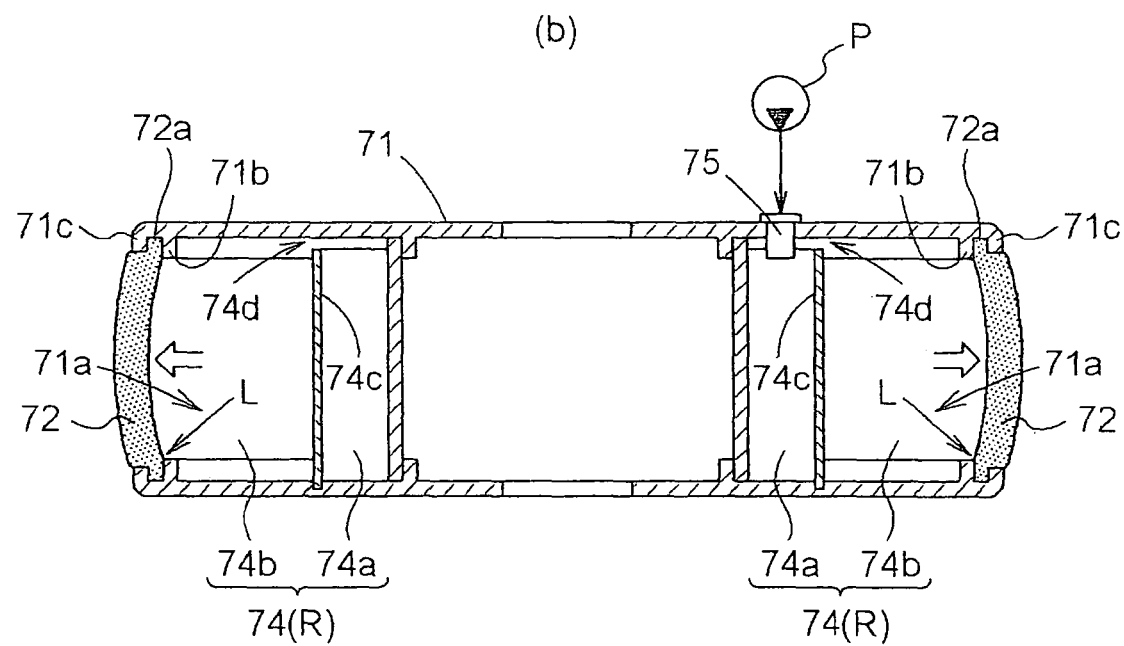
(b)

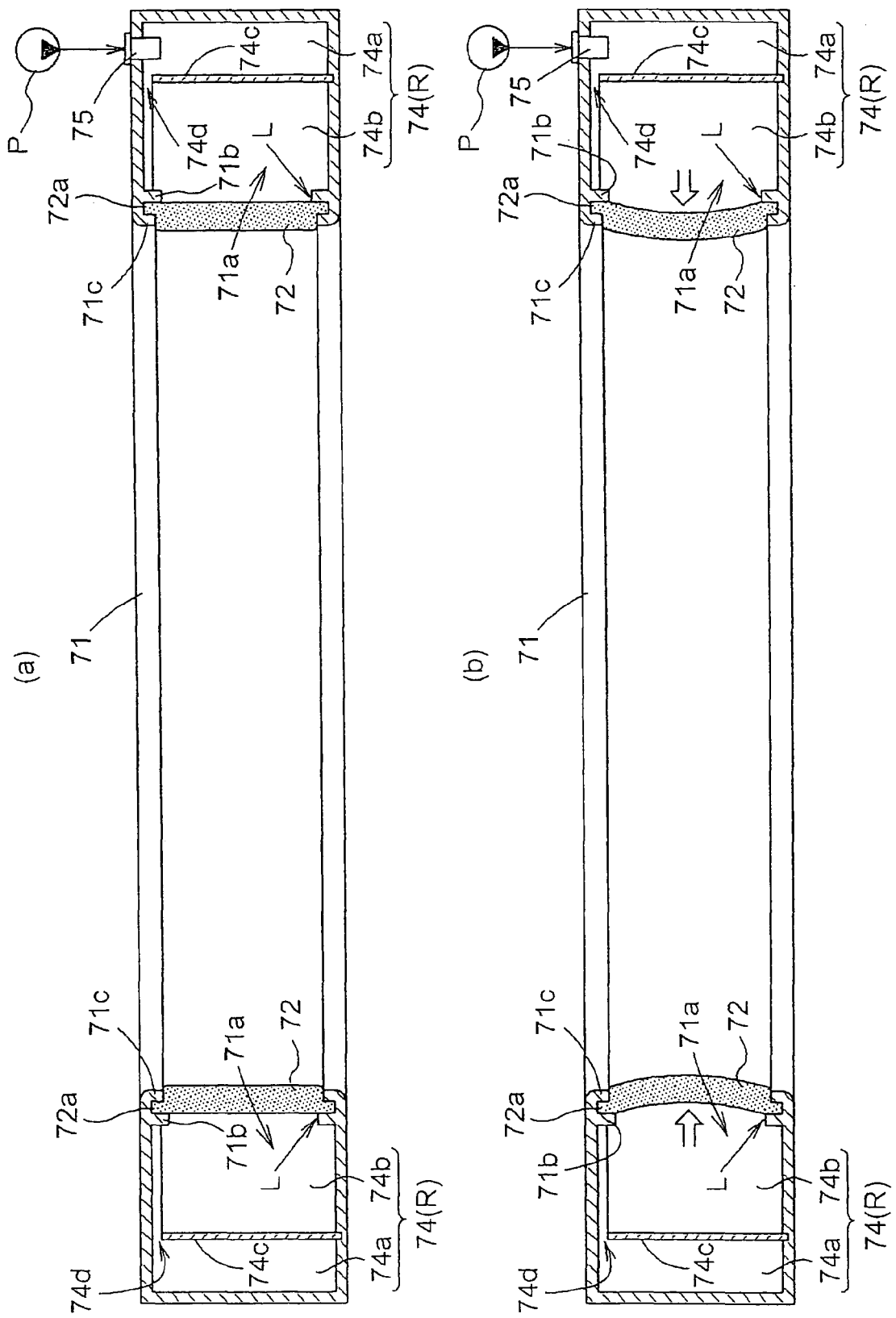
[Fig 2]

[Fig 3]
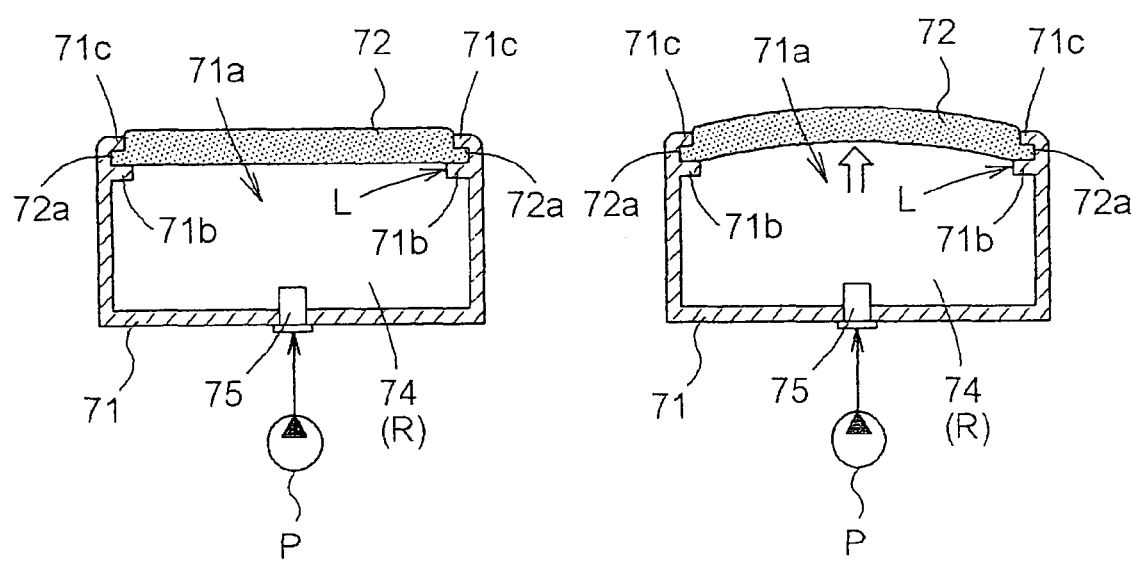

[Fig 4]
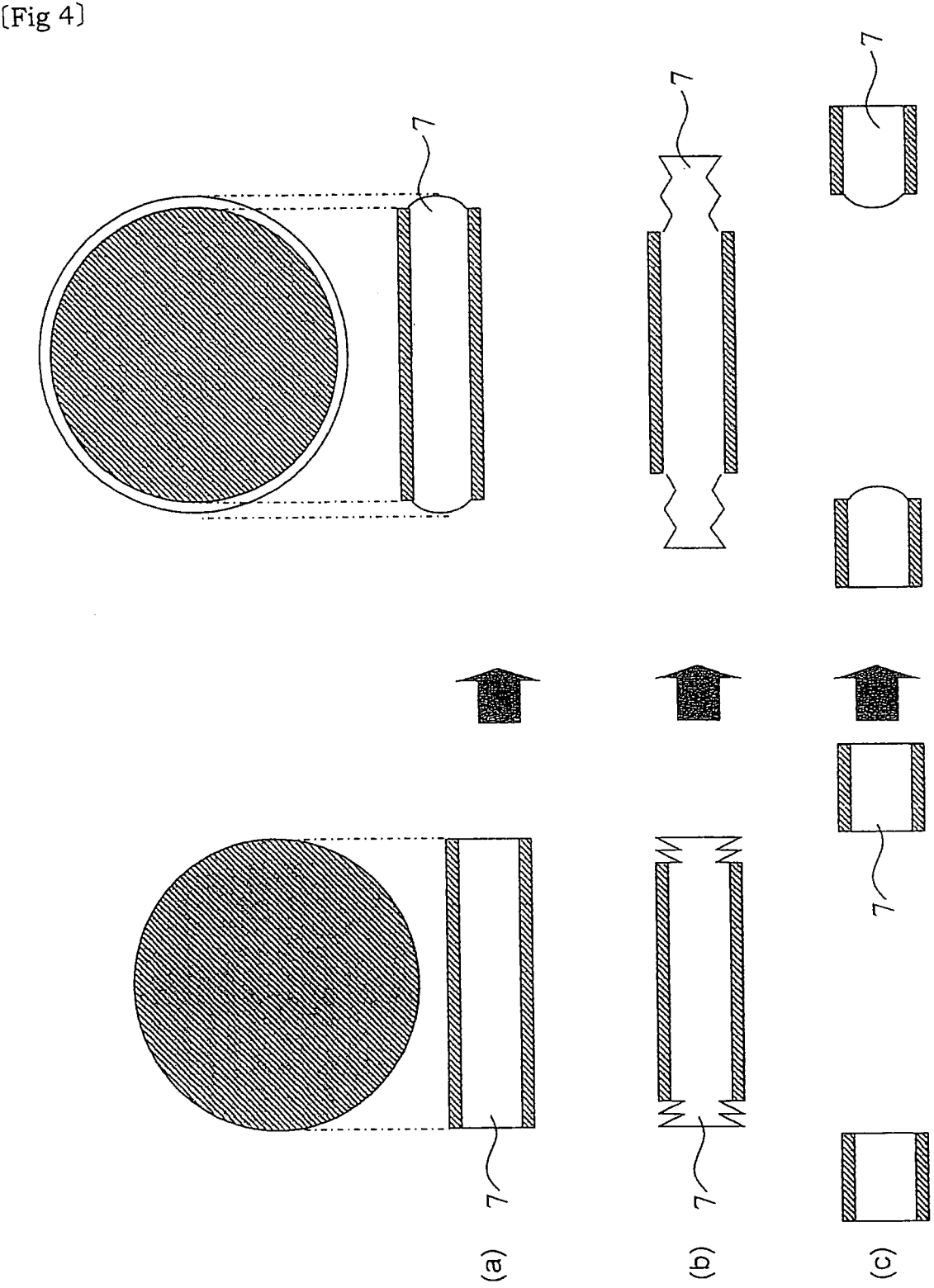

[Fig 5]
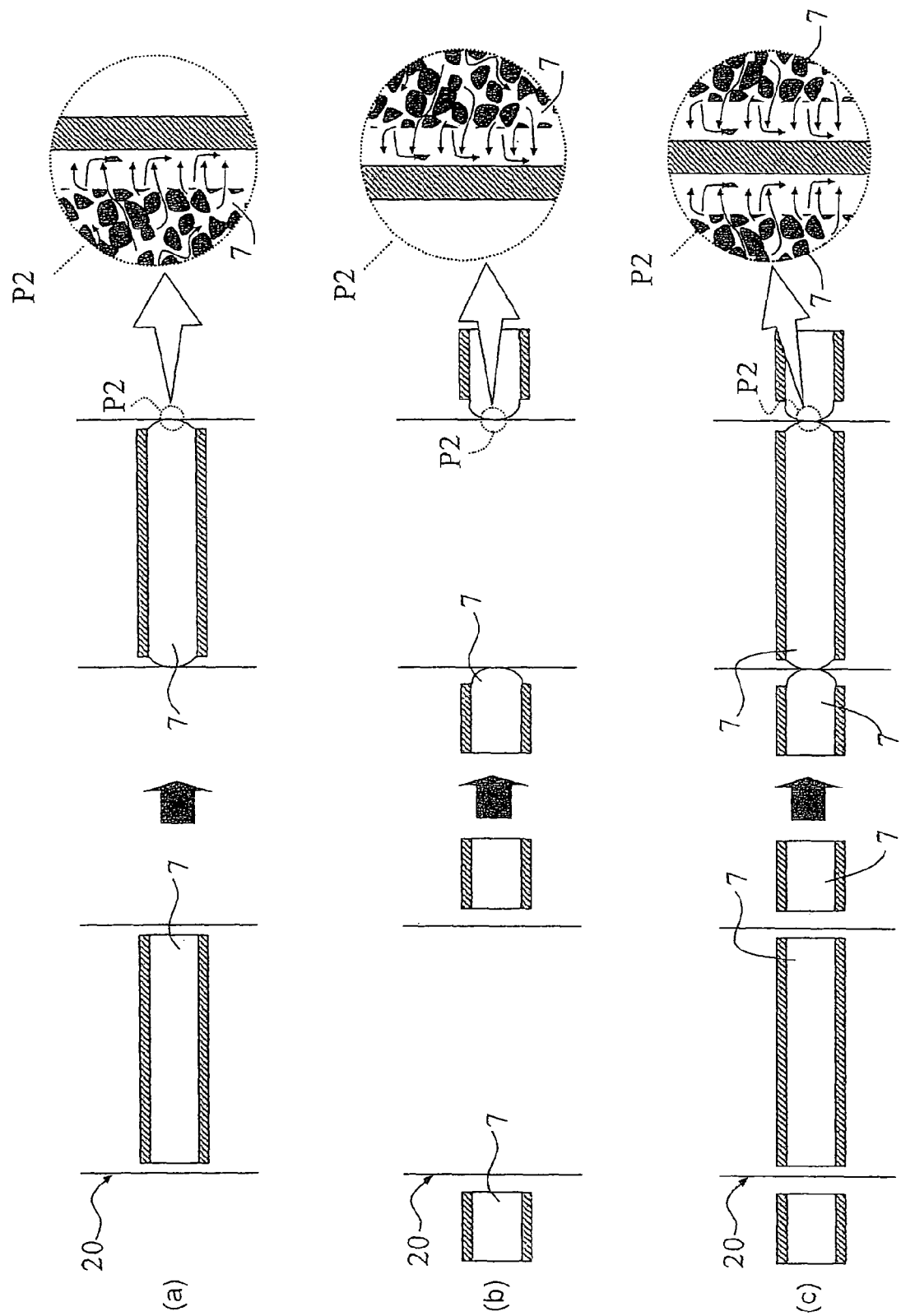

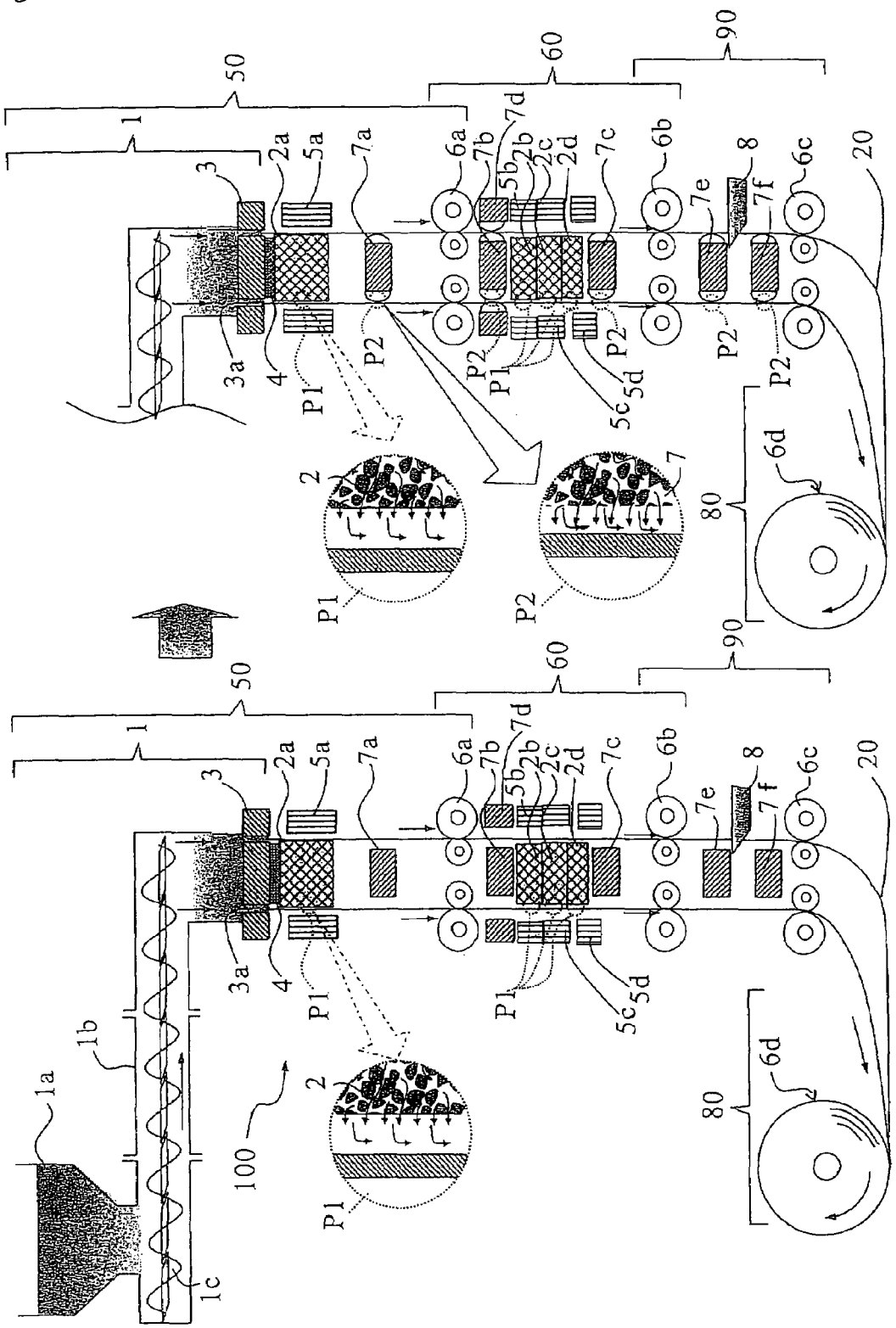
[Fig 6]

[Fig 7]
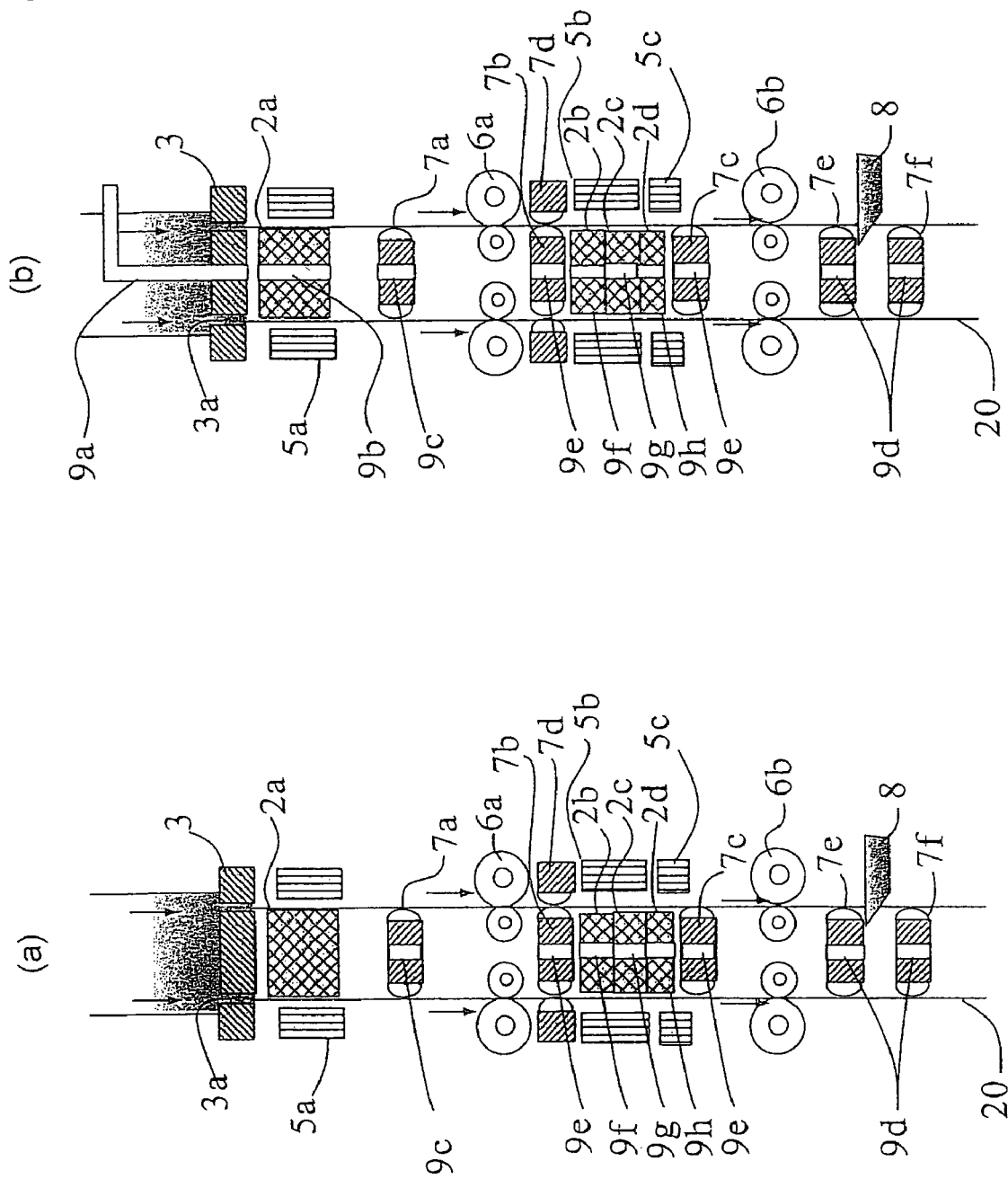

[Fig 8]
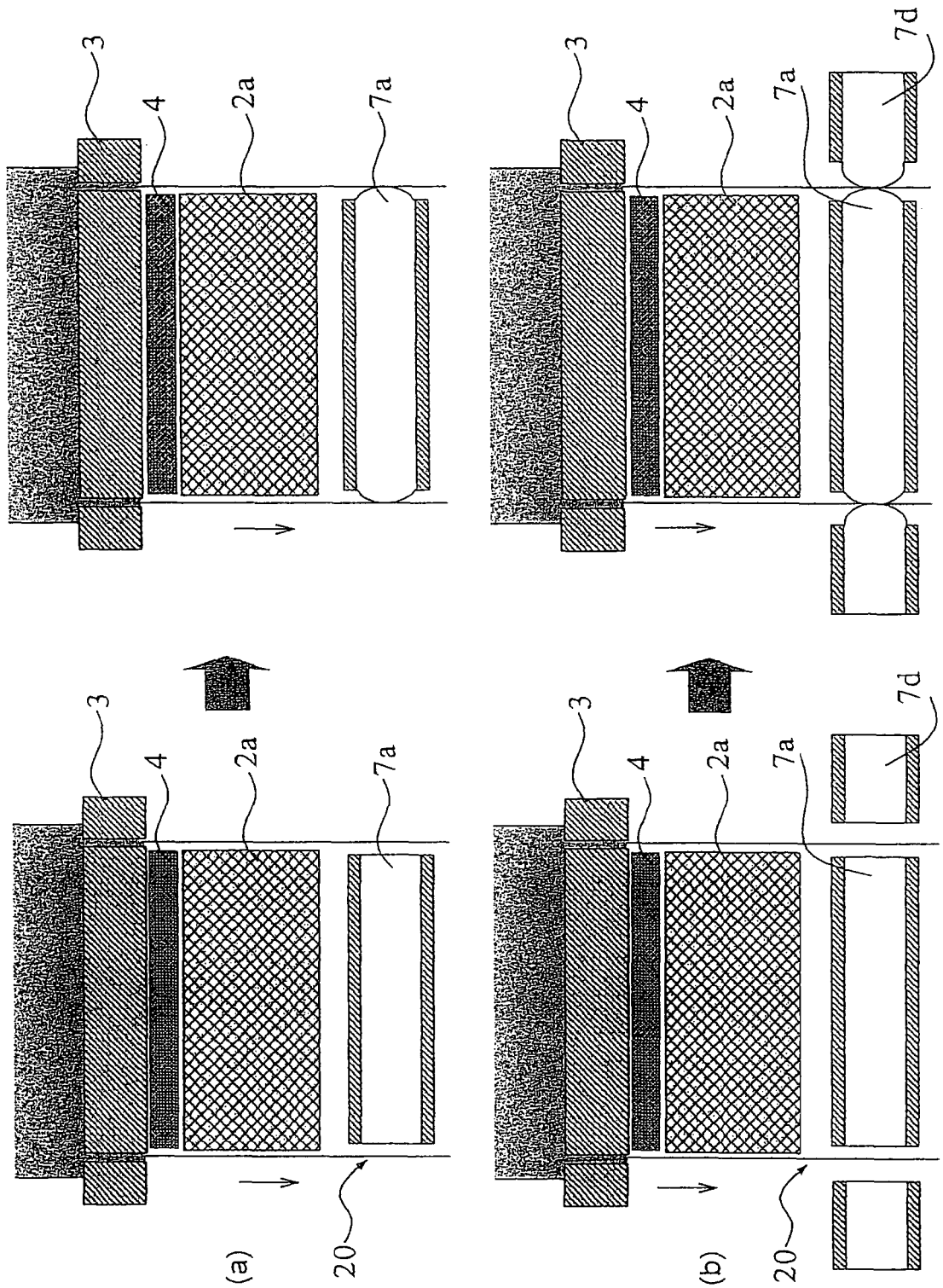

[Fig 9]
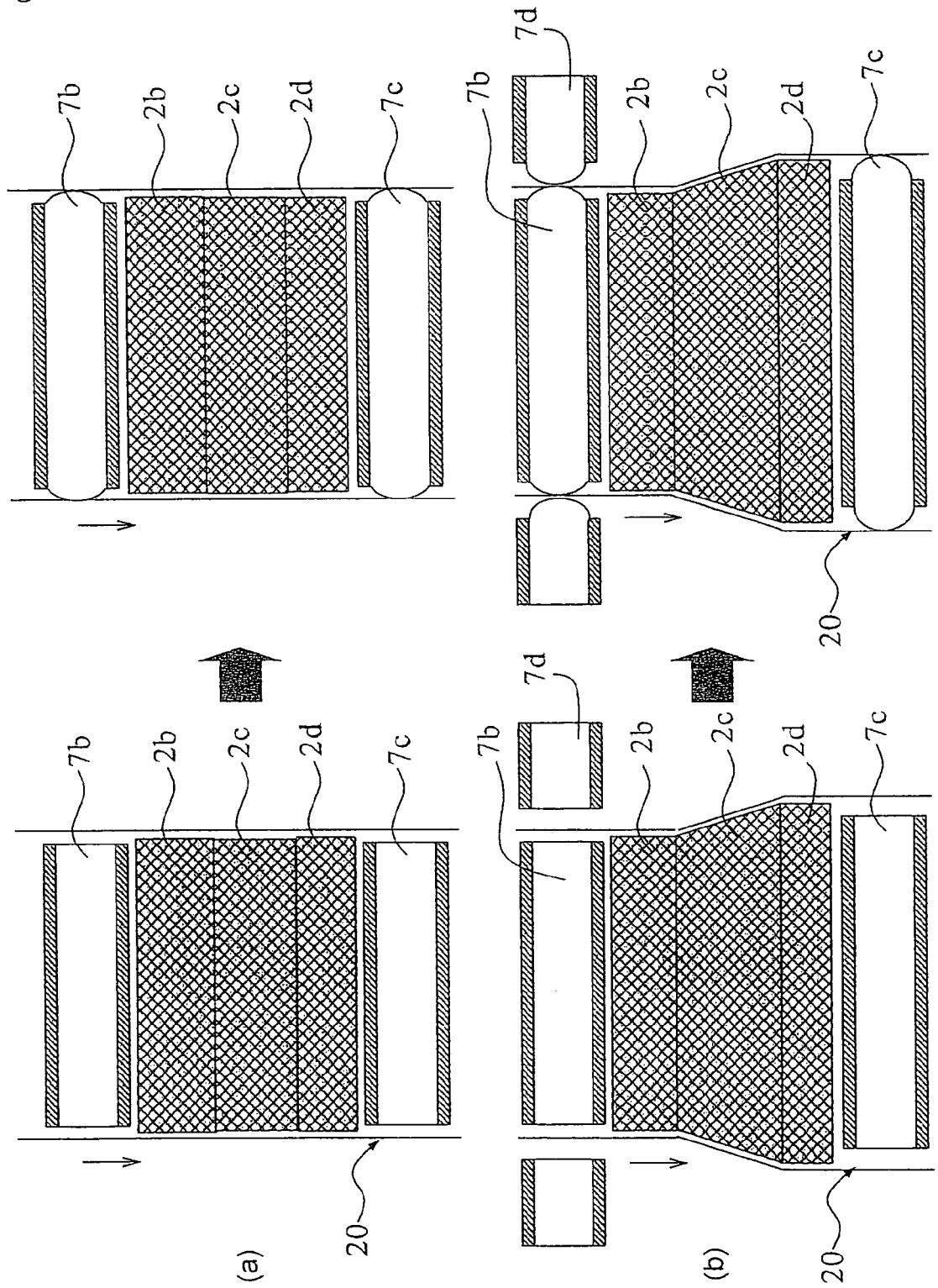

[Fig 10]
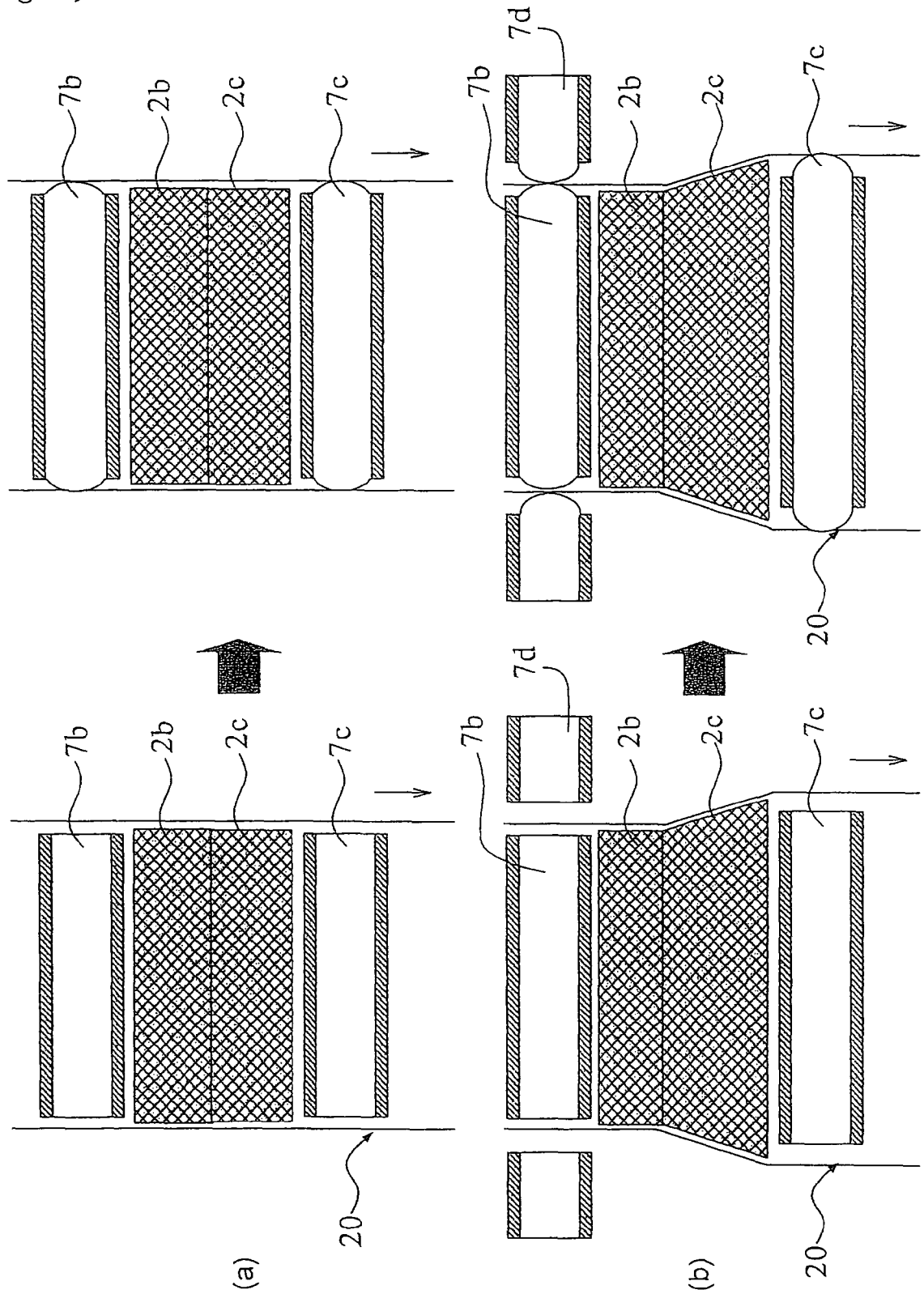

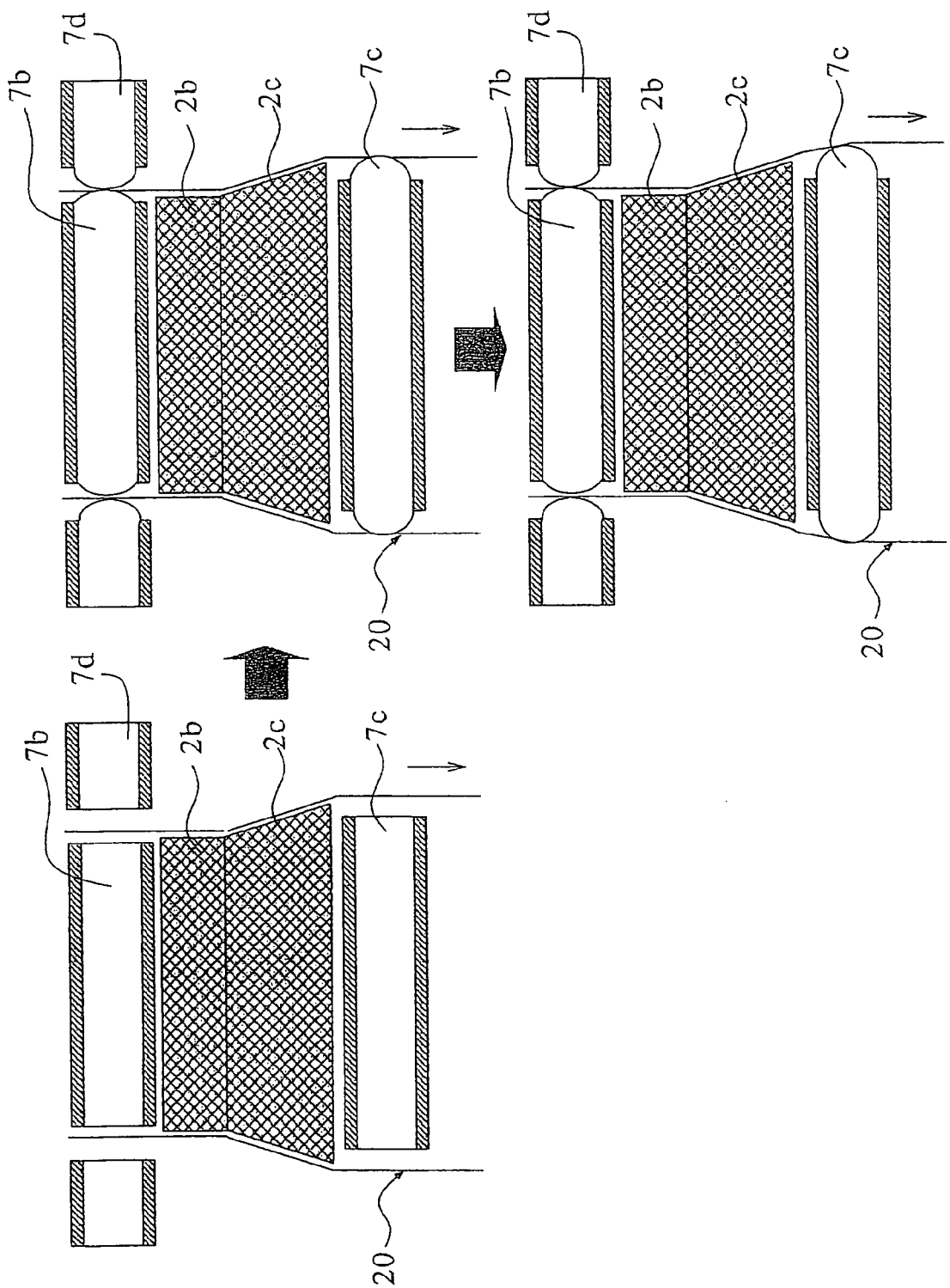

[Fig 12]
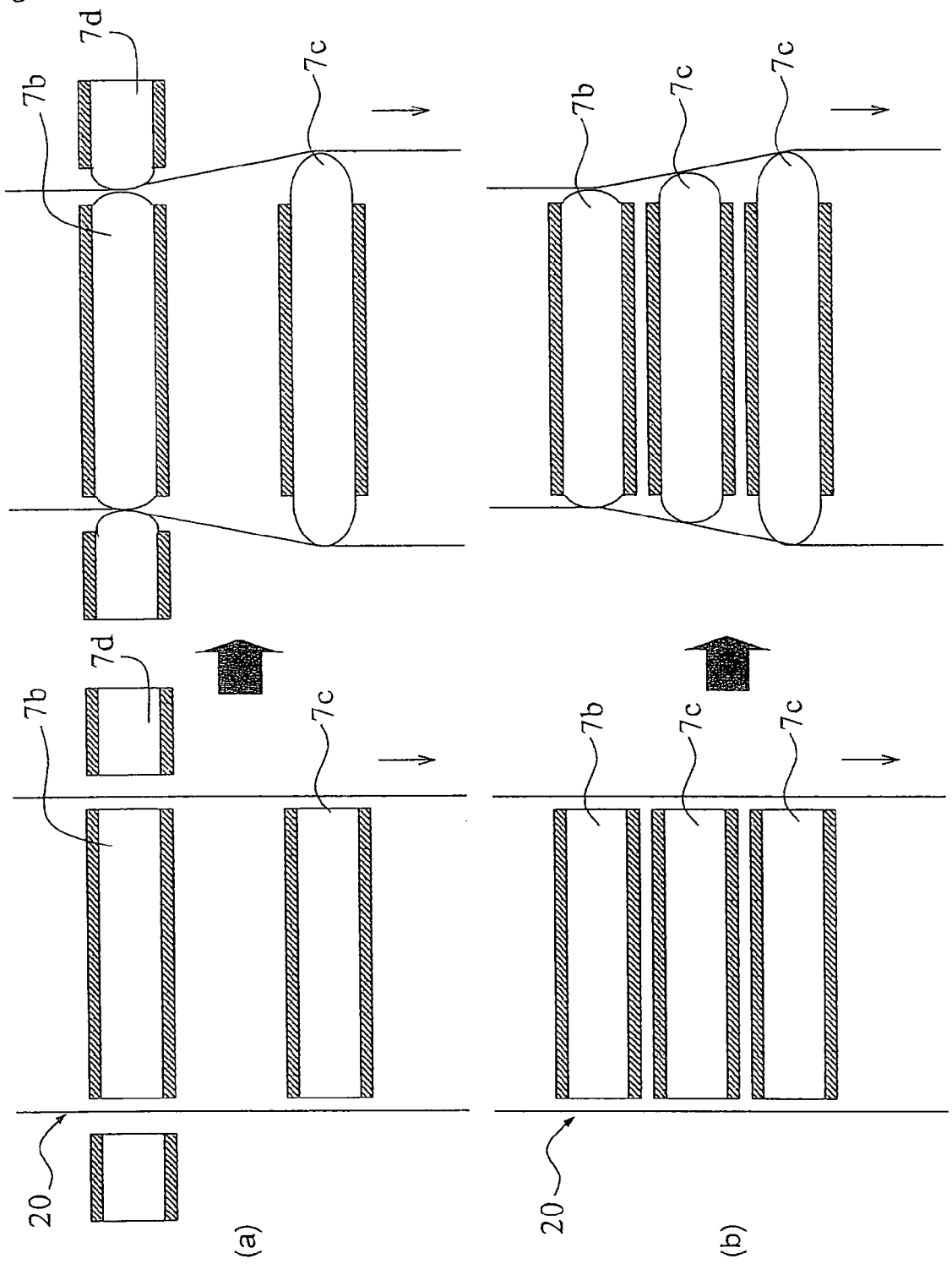

[Fig 13]
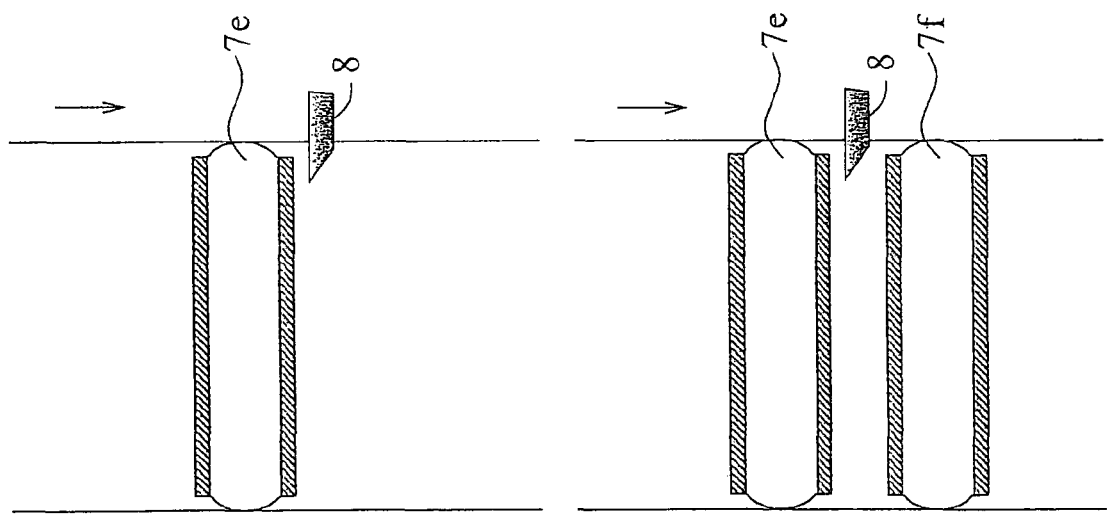
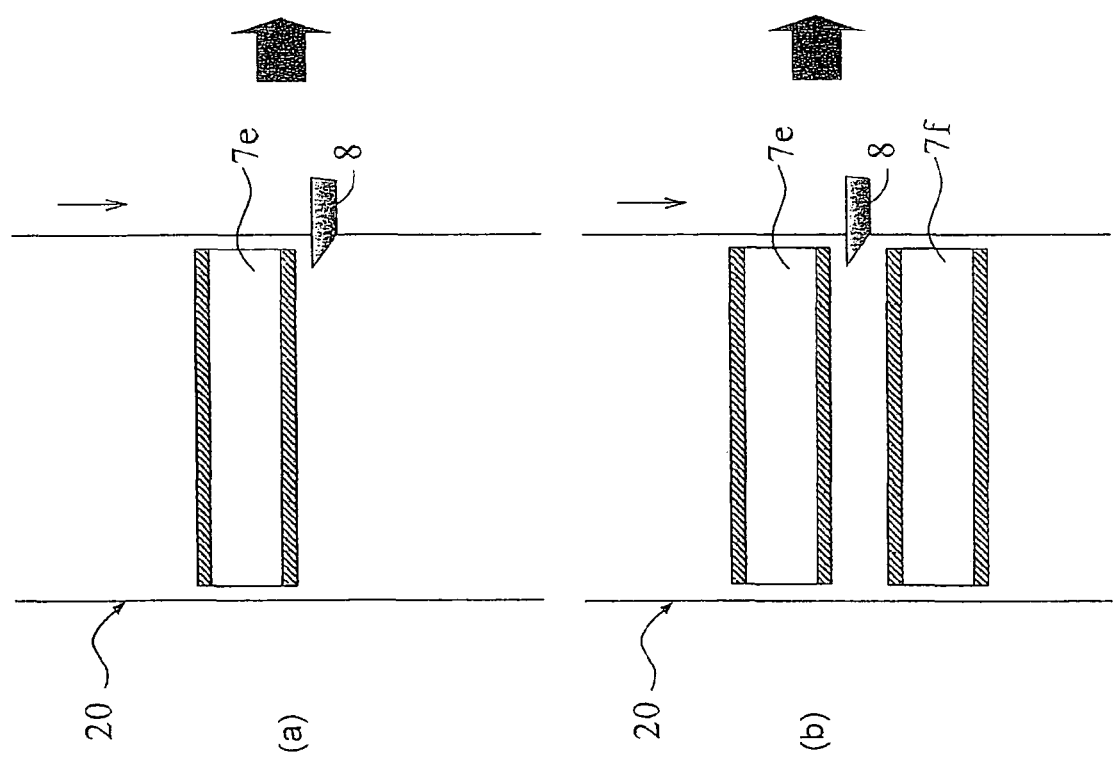
(a)   (b)

[Fig 14]
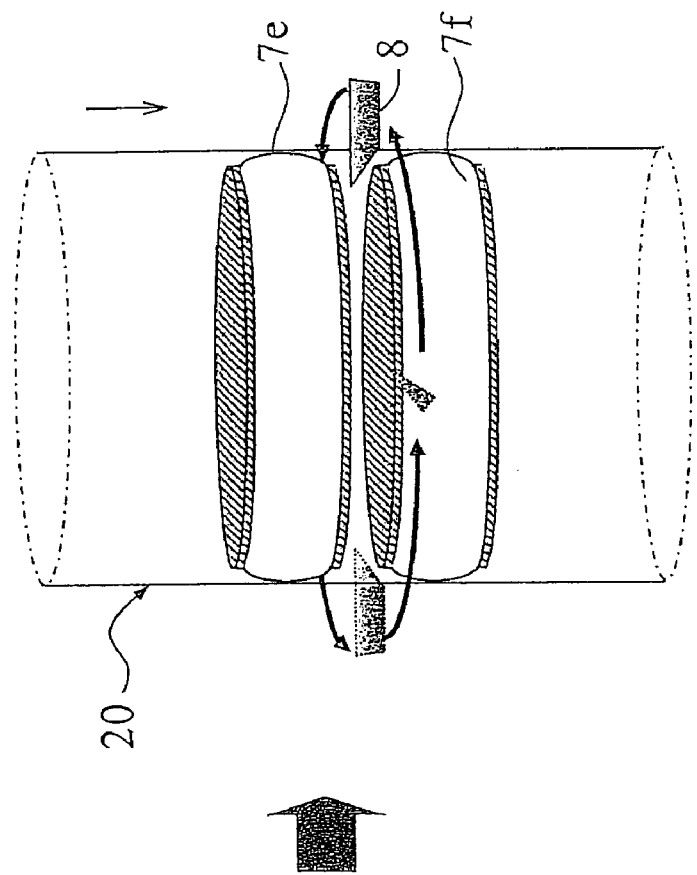
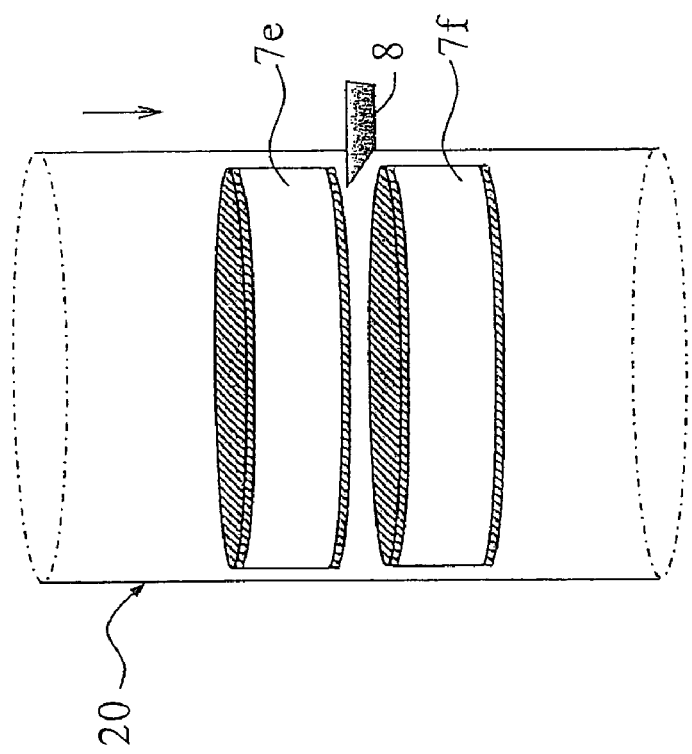

[Fig 15]
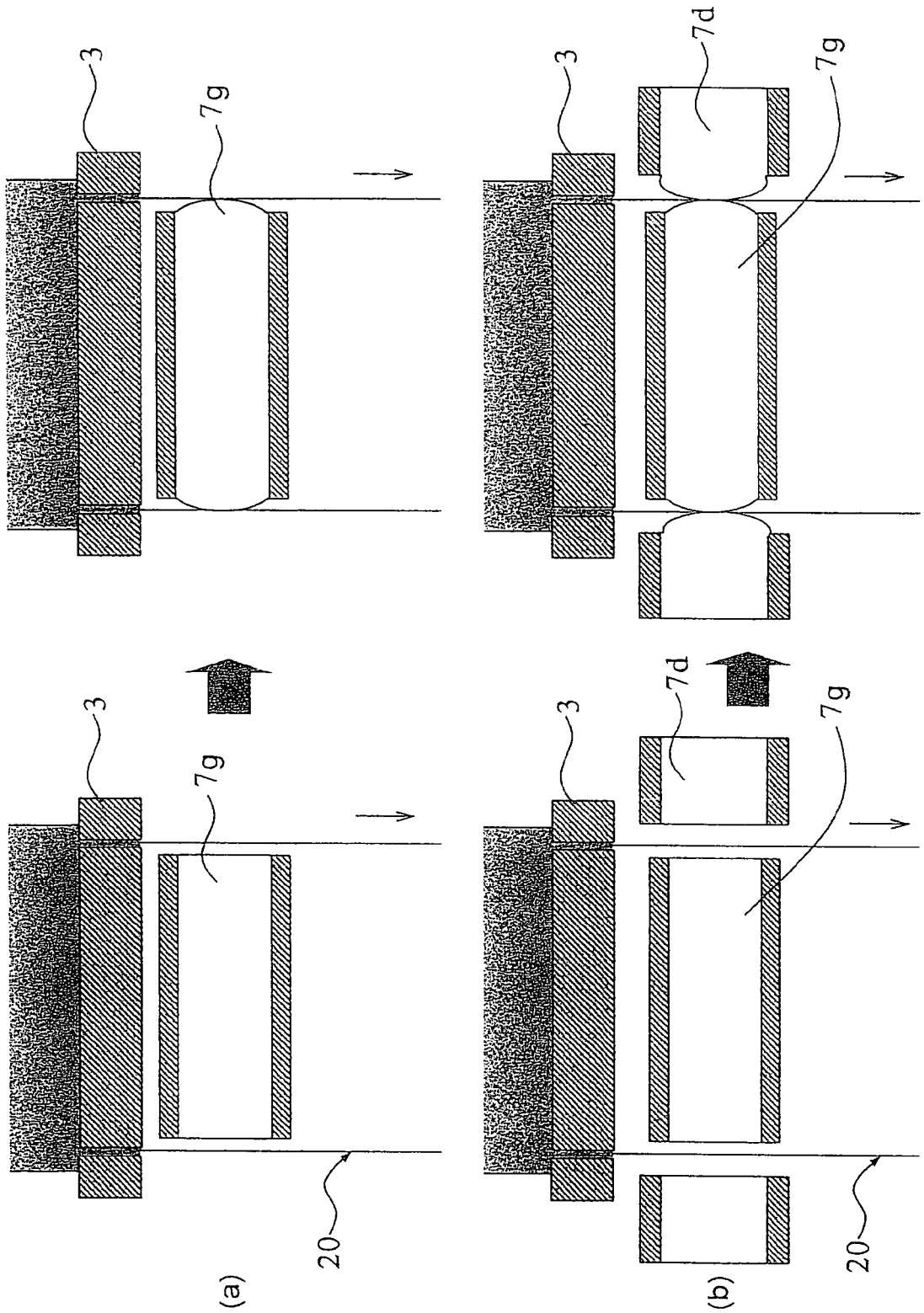

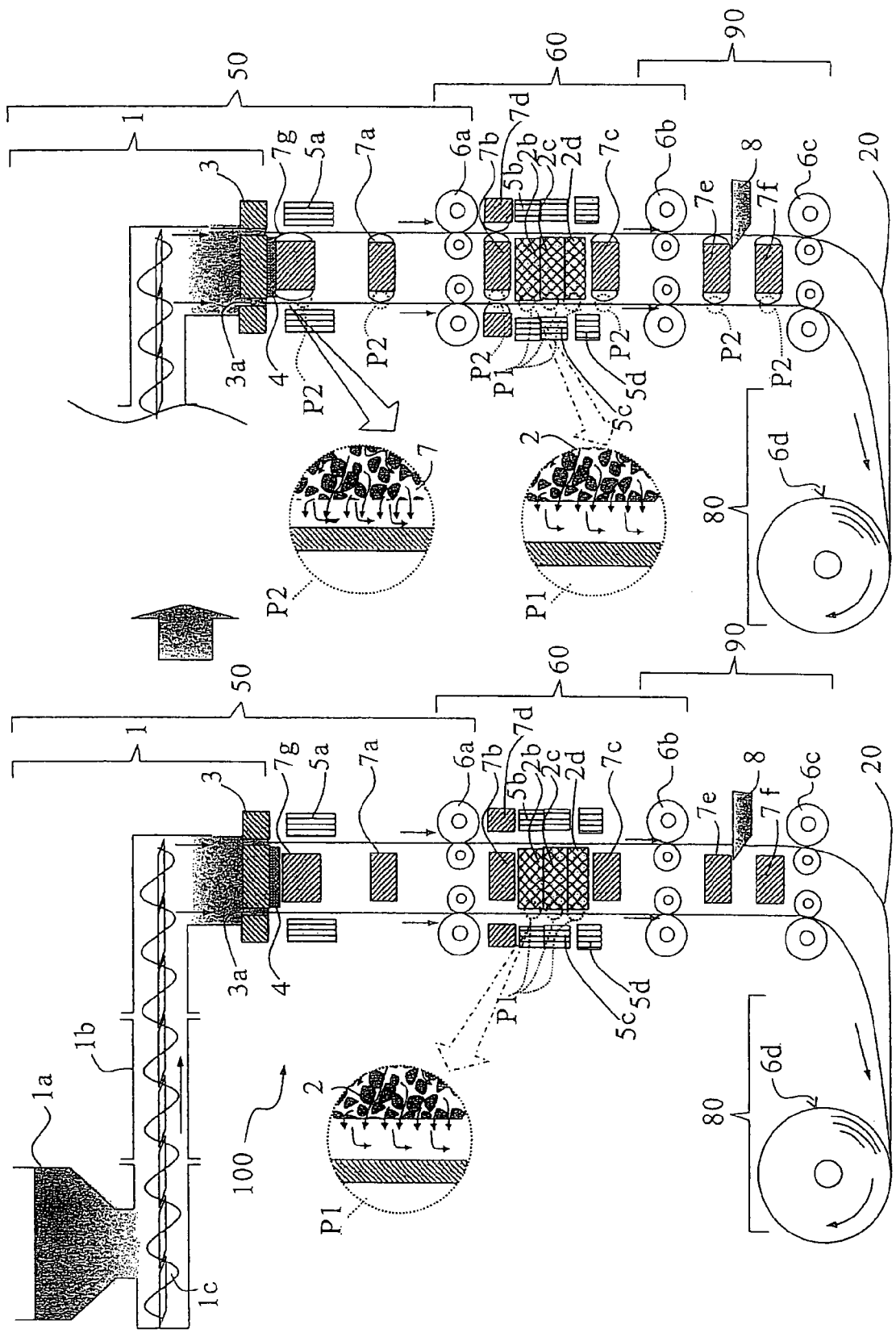
[Fig 16]

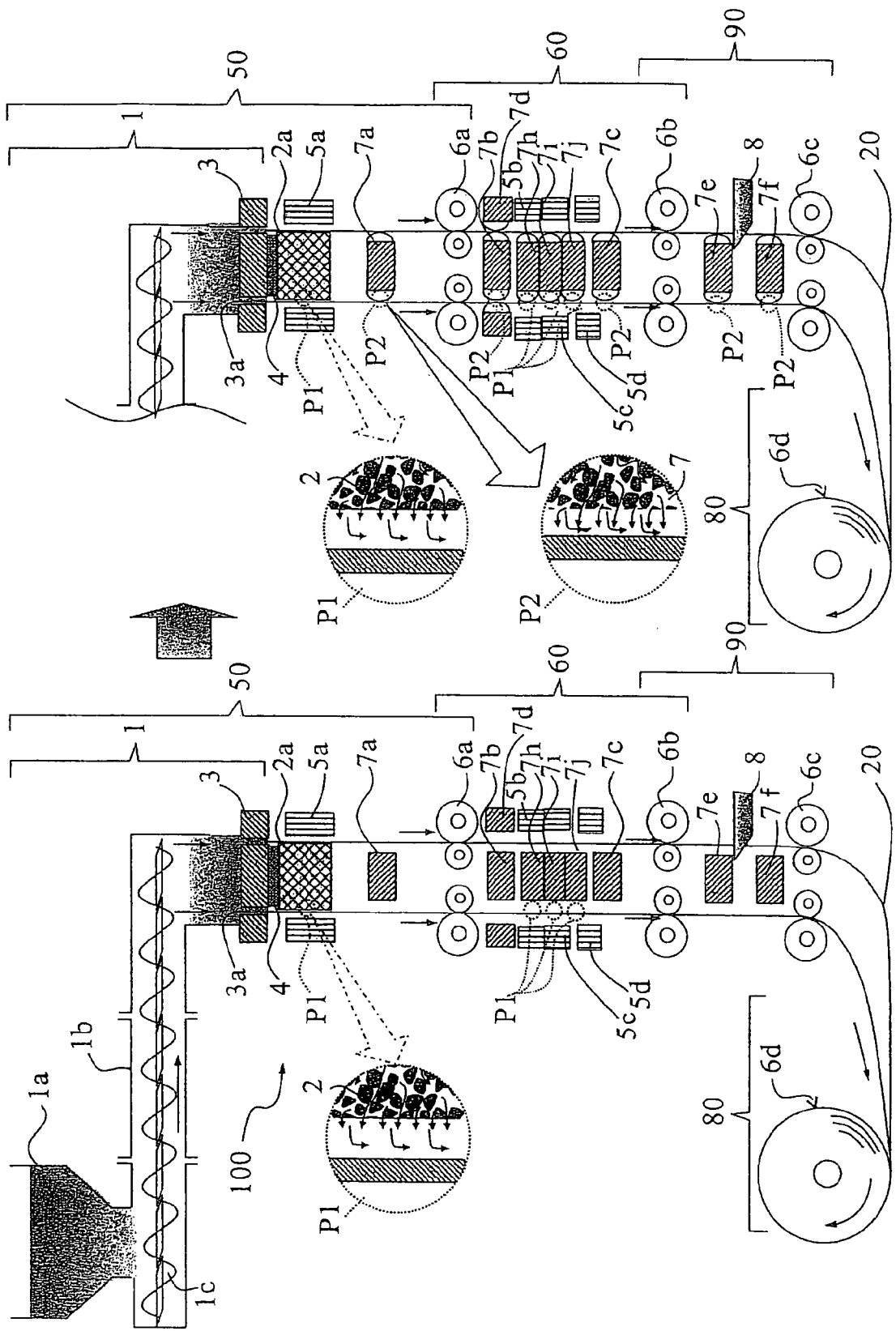
[Fig 17]

MANDREL, AND APPARATUS AND PROCESS FOR RESIN FILM PRODUCTION WITH MANDREL

TECHNICAL FIELD

The present invention relates to a mandrel, which, in continuously producing a resin film in continuous form, is disposed in proximity to or in contact with the surface of a moving film and guides the movement of the resin film. The present invention also relates to an apparatus and process that use a mandrel to produce a resin film.

BACKGROUND ART

Much research and development in thermoplastic resin films has been made by many researchers, businesses, and the like. Thermoplastic resin films have comparatively inexpensive raw materials, and also have excellent mechanical properties, chemical resistance, transparency, moisture permeability, and other such properties. These films therefore have a wide range of application, including packaging, miscellaneous goods, agriculture, industry, food products, medicine, and other fields.

There have recently been many examples in which thermoplastic resin films are used in the field of optics. Examples of thermoplastic resins include polycarbonate, cyclic polyolefins, polyethylene, polypropylene, and the like, but polycarbonate and cyclic polyolefins in particular have comparatively satisfactory transparency, and unstretched products are suitably used in light-guiding plates, anti-glare plates, starting materials for retardation films that have not yet been stretched, and the like. These films can be endowed with optical anisotropy (orientation) when subjected to stretching (uniaxial stretching or biaxial stretching). A film created from a thermoplastic resin endowed with this manner of orientation can be suitably used as a retardation film, which is used in a liquid-crystal display (LCD) or the like.

Various methods have been heretofore known and implemented for producing such thermoplastic resin films. Examples of methods that have been industrially used to produce thermoplastic resin films generally include solution casting, wherein a resin solution obtained by dissolving a resin in a solvent is cast and formed into a glass plate or the like (for example, see Patent Document 1); T-die extrusion, wherein a melted resin is extruded by an extruder and then cooled by a chill roll to form a film (for example, see Patent Document 2); tube extrusion, wherein a melted resin is extruded by an extruder into the shape of a tube (for example, see Patent Document 3); inflation extrusion, wherein a resin extruded into a tube shape is molded while air pressure is applied to the insides; and other such methods.

Particularly, to ensure a high rate of stretching, adjust the rate of stretching, and improve productivity, the following methods have been proposed. One is a method for opening up numerous split mandrels and stretching pipes or tubes (see Patent Document 6). Another method is proposed as a method for maintaining a stable operation. In this method, when an inflation film is molded, the constricted parts of the bubble formed by the film extruded from the lip of the inflation die is brought into contact either with a compressible cylindrical stabilizing member that is attached to the top center of a die and whose outside diameter is adjusted by air pressure, or with a coil spring wound in multiple stages around the outer periphery of this compressible cylindrical stable member, and the bubble is then expanded and pulled out (for example, see Patent Document 7). Another method proposed for producing high-quality films and improving efficiency is a method for producing a tubular plastic film wherein the film is extruded into a tube, and the diameter of the tube that has passed over a conical body is increased after the tube exits the extruder and before the tube reaches the pinching rollers (see Patent Document 8).

Recently, it has been proposed that stabilization means can be used to create a thin resin film product having a uniform and smooth surface, wherein nonuniformities in the thickness of the tubular film can be greatly reduced. It has also been proposed that it is possible to create an oriented, high-quality resin film product that has minimal thickness nonuniformities and stretching nonuniformities by passing the film through a stretching part and holding part formed with a porous mandrel or the like, and stretching the film there (for example, see Patent Documents 9 and 10).

[Patent Document 1] Japanese Laid-open Patent Application No. 5-239229
[Patent Document 2] Japanese Laid-open Patent Application No. 2000-219752
[Patent Document 3] Japanese Laid-open Patent Application No. 59-120428
[Patent Document 4] Japanese Laid-open Patent Application No. 60-259430
[Patent Document 5] Japanese Laid-open Patent Application No. 8-267571
[Patent Document 6] Japanese Laid-open Patent Application No. 50-56453
[Patent Document 7] Japanese Examined Patent Application No. 58-188626
[Patent Document 8] Japanese Laid-open Patent Application No. 52-2949
[Patent Document 9] WO2004-067260
[Patent Document 10] WO2004-067266

DISCLOSURE OF THE INVENTION

Problems that the Invention is Intended to Solve

However, the conventional methods for producing thermoplastic resin films described above have various problems. For example, a drawback of solution casting is that since a solution is used, the apparatus in general is complicated and bulky, causing production costs to be high. Furthermore, solution casting uses large amounts of solvent, and therefore imposes a large burden on the environment and contradicts current trends in environmental protection.

The problems with T-die extrusion are that since a bulky apparatus is used, a large surface area in which to place the apparatus is required, and the apparatus itself is extremely expensive. Furthermore, with T-die extrusion, precision in the thickness of the ends of the film is compromised when the film thickness is reduced, and there is no option but to discard the ends of the film. As a result, T-die extrusion has a problem of a reduced product yield rate. Also, films created by T-die extrusion are commonly stretched by tentering. In tentering, the ends of the film are held down by clips, and severe nonuniformities are therefore seen in the slow axis angles in the end portions, and only the middle of the film can be used.

Tube extrusion has been widely used in the past in the field of resin film molding, because the equipment can be configured to be comparatively small, and the product yield rate is also satisfactory. Tube extrusion can also produce a resin film in the shape of a tube, and a wide resin film can be obtained by cutting the tubular resin film in the longitudinal direction with a roll cutter or another cutting device. However, in this type of conventional tube extrusion, the resin extruded into a tube shape from the extruder is unstable and susceptible to effects from the external environment, and also is likely to change shape. It has therefore been extremely difficult to consistently obtain resin films of constant quality. Therefore, with tube extrusion, it has been difficult to stably obtain thin, flat-surfaced resin film products that can be used in retardation films and the like.

Inflation extrusion is a method for extruding a melted resin into a tube shape from an extruder, and then molding a resin film while blowing air on the inside of the resin. However, with this method as well, the resin extruded into a tube shape from the extruder is unstable, and slight changes in film tension or disturbances in air flow therefore cause wrinkles, sagging, surging, and other such problems in the film.

Therefore, a method for maintaining a stable operation has been proposed. In this method, when an inflation film is molded, the constricted parts of the bubble formed by the film extruded from the lip of the inflation die is brought into contact either with a compressible cylindrical stabilizing member that is attached to the top center of a die and whose outside diameter is adjusted by air pressure, or with a coil spring wound in multiple stages around the outer periphery of this compressible cylindrical stable member, and the bubble is then expanded and pulled out. Despite the use of this method, not only does the film not slide well against other objects and scrapes against the compressible cylindrical stable member or the coil spring wound around the external periphery of the stable member, but the subsequent expansion of air pressure also causes the film expand and stretch nonuniformly.

Thus, the problem with inflation extrusion remains unsolved, which is that it is difficult to stably produce thin resin film products having a uniform and flat surface.

A film stretching method has been proposed for opening up numerous split mandrels and stretching pipes or tubes in order to ensure a high rate of stretching, to adjust the rate of stretching, and to improve workability. However, when the structure is split or made discontinuous in the circumferential direction, the film comes into contact with the end of the discontinuous portion and is damaged, or becomes incapable of being uniformly fixed in place and stretched, which increases the probability of nonuniform film thickness or nonuniform stretching. Particularly in cases in which gas is used as a lubricant, problems are encountered in which air leaks out through the split gap and the effects of lubrication are lost. The film undergoes considerable damage when a large amount of gas is not used. When the amount of gas used is increased, it becomes difficult to control the various causes of thickness nonuniformity or stretching nonuniformity, such as uneven lubrication or temperature nonuniformity, and the probability of thickness nonuniformity or stretching nonuniformity in the film increases.

To produce high-quality films and to improve production efficiency, a tubular plastic film production method has been proposed wherein a film is extruded into a tube, and the diameter of the tube that has passed over a conical body is increased after the tube exits the extruder and before the tube reaches the pinching rollers. With this method, the expandable conical body is split and made discontinuous in the circumferential direction, and it appears that the film can be held down and stretched in a comparatively stable manner because an air cushion between the expandable conical body and the film acts as a lubricant. To form this air cushion, the pressure in the tube is increased because air is fed in through the portion other than the conical body, not only contracting and expanding the film, but also varying the spaces between the film and the two conical bodies when the balance between two conical bodies is disrupted, thereby unbalancing the airflow. The possibility is therefore high that the film will scrape, become hung up, and become unsteady. Furthermore, a large amount of air must be supplied in order to create an air cushion, and this air flow causes the cooling of the film to be nonuniform, causing thickness nonuniformities and stretching nonuniformities.

Therefore, a film obtained by conventional or improved tube extrusion or inflation extrusion has large thickness nonuniformities and stretching nonuniformities. It has therefore not been possible to suitably use these methods with optical films, retardation films, starting materials for retardation films, or the like.

Recently it has been proposed that the use of stabilization means makes it possible to create a thin resin film product having a uniform, flat surface, wherein nonuniformity in the thickness of a tubular film is greatly reduced. It has also been proposed that the use of stabilization means makes it possible to create a high-quality resin film product that is manufactured using a porous mandrel or the like, has minimal thickness nonuniformities and stretching nonuniformities, and is provided with orientation by being passed through, and stretched with, a stretching part and a holding part. This method has made it possible to create a resin film having minimal thickness nonuniformities and stretching nonuniformities, but this method has also been subject to the following problems: the film is damaged as a result of the film vibrating; the diameter of the conical stretching mandrel cannot be changed and it is difficult to finely adjust the stretching rate and to pass the film through the stretching mandrel; and the stretching rate can be adjusted when a split mandrel is used, but the split portion does not come in contact with the film, the stretching rate cannot be uniformly controlled, and the scraping of the film damages the film in the end of the split portion.

The present invention was designed in view of the problems described above, and an object thereof is to provide an apparatus and method for producing a resin film product that cannot be obtained by conventional tube extrusion or inflation extrusion or the like from a thermoplastic resin in a stable manner without damage to the product, wherein the resin film product is thin and has a uniform, flat surface; and to provide an apparatus and method for resin film production wherein the stretching rate can be freely adjusted, the film can be stretched uniformly without being damaged, and the method can be suitably used in retardation film production and the like.

Means for Solving the Problems

A first aspect of the present invention is a mandrel that comes into proximity or contact with the surface of a moving resin film to guide the movement of the resin film when a resin film in continuous form is continuously produced, the mandrel comprising a mandrel main body having an opening, and a guide part that is composed of an elastic member attached to the opening and that can advance and retract relative to the resin film.

According to the present configuration, since the guide part attached to the opening of the mandrel main body can advance and retract relative to the film, the advance and retraction of the guide part can be adjusted to obtain an arbitrary state of proximity or contact with the resin film. As a result, the moving resin film can be guided in a stable manner.

According to a second aspect of the present invention, the guide part has a plurality of pores, an internal space is formed between the guide part and the mandrel main body, and fluid seepage means is provided in the internal space so as to allow fluid to seep out through the side facing the internal space via the pores.

According to the present configuration, since the fluid seepage means provided in the internal space between the guide part and the mandrel main body can allow fluid to seep out through the side facing the internal space via the pores in the guide part, the guide part comes into proximity or contact with the resin film via the fluid. As a result, friction between the guide part and the resin film can be reduced, and the film from can be prevented from being damaged by the guide part in the resin film.

According to a third aspect of the present invention, the pores are formed by configuring the guide part from a porous material.

According to the present configuration, since the pores are formed by configuring the guide part from a porous material, the fluid seeps out through pores distributed uniformly in the surface of the porous material, and the amount of fluid seeping out can be prevented from varying in localized manner. Therefore, friction between the guide part and the resin film can be further reduced. As a result, it is possible to more reliably prevent the resin film from being damaged by the guide part.

According to a fourth aspect of the present invention, a fluid retention part constituting the fluid seepage means is provided in the internal space, and the advance and retraction deformation of the guide part is controlled by adjusting the pressure of the fluid retained in the fluid retention part.

According to the present configuration, since the advance and retraction deformation of the guide part is controlled by adjusting the pressure of the fluid retained in the fluid retention part constituting the fluid seepage means, there is no need to provide separate means for controlling the advance and retraction of the guide part. As a result, the apparatus can be simplified, and it is therefore possible to inexpensively obtain a mandrel wherein the advance and retraction of the guide part can be controlled.

According to a fifth aspect of the present invention, the mandrel main body comprises a fluid supply and drainage part for supplying the fluid to the fluid retention part or for draining the fluid from the fluid retention part; and the fluid retention part is partitioned by a partitioning wall into a first space communicated with the fluid supply and drainage part and a second space communicated with the pores in the guide part, and a communicating part for communicating the first space with the second space is provided along the extending direction of the partitioning wall to the partitioning wall.

According to the present configuration, since the fluid supplied to the first space is supplied to the second space via the communicating part provided along the extending direction of the partitioning wall, the fluid can be uniformly supplied to the second space. As a result, the guide part can be made to advance and retract uniformly because there is no localized variation in the pressure of the fluid in the second space.

According to a sixth aspect of the present invention, the region where the guide part and the mandrel main body connect is configured so that the mandrel main body holds the edges of the guide part on both sides along a direction of a normal line in relation to the surface of the guide part.

According to the present configuration, since the region where the guide part and the mandrel main body connect is configured so that the mandrel main body holds the edges of the guide part on both sides along a direction of a normal line in relation to the surface of the guide part, variation by location in the advance of the guide part can be reduced, and the guide part can be made to advance and retract while the desired shape is maintained in the guide part. The edges of the guide part can be pressed against the mandrel main body during advance or retraction of the guide part to improve airtightness, and fluid can therefore be prevented from leaking out from the region where the mandrel main body and the guide part are connected.

According to a seventh aspect of the present invention, the mandrel comprises a deformation restricting part that extends between the side of the mandrel main body and the guide part and restricts the ability of the guide part to deform in a protruding shape past a specific amount.

According to the present configuration, since the guide part can be prevented from deforming in a protruding shape past a specific amount, it is possible to prevent the guide part from excessively protruding in localized manner, for example. As a result, variation by location in the advance of the guide part can be reduced, and the shape of the protruding guide part can be maintained as expected.

According to an eighth aspect of the present invention, the mandrel comprises a temperature adjustment device for heating or cooling the guide part.

According to the present configuration, the guide part can be set to the desired temperature, and the temperature of the resin film can therefore be optimally set according to the processing of the resin film.

According to a ninth aspect of the present invention, the guide part is attached to the mandrel main body so as to constitute an external peripheral surface of a substantially cylindrical shape or an internal peripheral surface of a substantially cylindrical shape.

According to the present configuration, the guide part is attached to the mandrel main body so as to constitute an external peripheral surface of a substantially cylindrical shape or an internal peripheral surface of a substantially cylindrical shape. Therefore, the external peripheral surface of the substantially cylindrical shape can be brought into proximity or contact with the internal peripheral surface of the tubular resin film, or the internal peripheral surface of the substantially cylindrical shape can be brought into proximity or contact with the external peripheral surface of the tubular resin film to guide the movement of the tubular resin film.

According to a tenth aspect of the present invention, the mandrel having any of the first through ninth aspects described above is used at the site of at least one part selected from a molding part for molding a thermoplastic resin into a tubular resin film after the resin is extruded into a tube shape from a metal cap in a heating extruder; a cooling part for cooling the molded tubular resin film; a conveying part for winding up the cooled tubular resin film at a constant speed; and a holding part for holding the shape of the cooled tubular resin film.

According to the present configuration, in the extrusion-molding device for a tubular resin film, since the mandrel described above is used at the site of at least one part selected from a molding part, a cooling part, a conveying part, and a holding part, the guide part can be made to advance and retract according to the purpose of the region to achieve a desired state of proximity or contact between the guide part and the tubular resin film. As a result, the resin film can be prevented from being damaged because the resin film can be guided appropriately.

According to an eleventh aspect of the present invention, the mandrel having any of the first through ninth aspects described above is used at the site of at least one part selected from a conveying part for conveying a tubular resin film; a heating part for heating the tubular resin film; a stretching part for stretching the heated tubular resin film; a cooling part for cooling the stretched tubular resin film; and a holding part for holding the shape of the stretched tubular resin film.

According to the present configuration, in the stretching device for a tubular resin film, since the mandrel described above is used at the site of at least one part selected from a conveying part, a heating part, a stretching part, and a cooling part, the guide part can be made to advance and retract according to the purpose of the region to achieve a desired state of proximity or contact between the guide part and the tubular resin film. As a result, the resin film can be prevented from being damaged because the resin film can be guided appropriately.

According to a twelfth aspect of the present configuration, the device comprises a cutting part for cutting the molded tubular resin film, and a mandrel having any of at least one of the first through ninth aspects described above.

According to the present configuration, since the cutting device for a tubular resin film comprises a mandrel having any of the first through ninth aspects described above, the tubular resin film can be cut while being held by the mandrel. As a result, the tubular resin film can be prevented from being moved or vibrated by an urging force generated by contact with the cutting member, for example, and the tubular resin film can be cut in a stable manner.

According to a thirteenth aspect of the present invention, an extrusion-molding method for a tubular resin film method comprises a molding step for molding a thermoplastic resin into a tubular resin film after the heat-melted thermoplastic resin is extruded into the tube shape through a metal cap in a heating extruder; a cooling step for cooling the molded tubular resin film; a conveying step for pulling down the cooled tubular resin film at a constant speed; and a holding step for holding the shape of the cooled tubular resin film, wherein the method uses the mandrel having any of the first through ninth aspects in any of at least one of the steps described above.

According to the present configuration, since the mandrel described above is used in any of at least one of the molding step, the cooling step, the conveying step, and the holding step, the guide part can be made to advance and retract according to the purpose of the step to achieve a desired state of proximity or contact between the guide part and the tubular resin film. As a result, the resin film can be prevented from being damaged because the resin film can be guided appropriately.

According to a fourteenth aspect of the present invention, a stretching method for a tubular resin film comprises a conveying step for conveying a tubular resin film; a heating step for heating the tubular resin film; a stretching step for stretching the tubular resin film; and a cooling step for cooling the stretched tubular resin film, wherein the method uses the mandrel having any of the first through ninth aspects in any of at least one of the steps described above.

According to the present configuration, since the mandrel described above is used in any of at least one of the conveying step, the heating step, the stretching step, and the cooling step, the guide part can be made to advance and retract according to the purpose of the step to achieve a desired state of proximity or contact between the guide part and the tubular resin film. As a result, the resin film can be prevented from being damaged because the resin film can be guided or stretched appropriately in the step described above.

According to a fifteenth aspect of the present invention, the method comprises a holding step for holding, prior to a cutting step for cutting a molded tubular resin film open into a flat shape by means of a cutting member, the shape of the tubular resin film while a mandrel having any of the first through ninth aspects described above is disposed on the inside of the molded tubular resin film, is expanded to a specific diameter from a diameter equal to or less than the inside diameter of the film, and is brought into proximity or contact with the tubular resin film via the fluid.

According to the present configuration, the tubular resin film is cut by the cutting member while the inside of the tubular resin film is held by the mandrel. As a result, the tubular resin film can be cut in a stable manner because the tubular resin film can be prevented from being moved and vibrated by an urging force or the like generated by contact with the cutting means, for example.

EFFECT OF THE INVENTION

Mandrel

The mandrel according to the present invention can be brought into proximity or contact with the internal peripheral surface of a moving resin film and used to guide the movement of the resin film when a tubular resin film or a flat resin film in continuous form, for example, is continuously produced. The diameter of this mandrel can be varied without splitting the mandrel in the circumferential direction.

FIG. 1 is a cross-sectional view showing a mandrel 7. This mandrel 7 is substantially cylindrical and comprises a mandrel main body 71 having an opening 71a in the external peripheral portion of the cylinder, and a guide part 72 that is attached to the opening 71a and that constitutes the external peripheral surface of the substantially cylindrical shape.

The opening 71a to which the guide part 72 is attached is provided to the external peripheral portion of the mandrel main body 71. First holding parts 71b and second holding parts 71c for holding the guide part 72 are provided close to the external periphery of the mandrel main body 71. The first holding parts 71b are provided around the entire external periphery of the mandrel main body 71, and the second holding parts 71c are provided farther inside than the first holding parts 71b and are disposed around the same entire periphery and parallel to the first holding parts 71b.

The mandrel main body 71 is provided with a fluid supply and drainage part 75 for supplying fluid to a fluid retention part 74 or draining the fluid from the fluid retention part 74. Fluid supply and drainage means P for supplying and draining fluid is connected to the fluid supply and drainage part 75.

The guide part 72 disposed in proximity or contact with the resin film is provided to the portion of the mandrel main body that has the opening 71a. The first holding parts 71b and the second holding parts 71c hold edges 72a of the guide part 72 on both sides along a normal line in relation to the surface of the guide part 72, thereby connecting the guide part 72 to the opening 71a. The guide part 72 can advance toward the resin film and retract through the opening 71a in accordance with the pressure of fluid in the fluid retention part 74, which is described later. The first holding parts 71b, the second holding parts 71c, and the edges 72a of the guide part 72 constitute a deformation restricting part L. Since both of the edges 72a of the guide part 72 are held around their entire peripheries by the first holding parts 71b and the second holding parts 71c, the edges 72a do not deform even when the vicinity of the center of the guide part 72 deforms into a protruding shape. Therefore, the advanced guide part 72 can be given, e.g., a cylindrical shape or another desired shape. The deformation restricting part L may also be, e.g., multiple rod-shaped members or cord-shaped members or the like provided in a radial pattern between the vicinity of the height-wise centers of a partitioning wall 74c and the vicinity of the height-wise centers of the guide part 72. Providing the deformation restricting part L in this manner makes it possible for the rod-shaped members or cord-shaped members to prevent excessive advance in cases in which part of the guide part 72 acts as though to excessively advance in localized manner, for example. Therefore, the desired shape can be maintained in the advanced guide part 72.

An internal space is formed between the guide part 72 and the mandrel main body 71 inside the mandrel 7. This internal space functions as a fluid retention part 74 for retaining fluid that seeps out through the guide part 72. The advance and retraction deformation of the guide part 72 can be controlled by adjusting the pressure of the fluid retained in the fluid retention part 74. The fluid retention part 74 is provided with a partitioning wall 74*c* for partitioning a first space 74*a* for communicating the fluid retention part 74 with the fluid supply and drainage part 75, and a second space 74*b* for communicating the fluid retention part 74 with pores in the guide part 72. The dividing wall 74*c* faces the guide part 72 and extends along the circumferential direction of the mandrel 7. In the present embodiment, the side of the fluid retention part 74 nearer to the internal periphery of the mandrel 7 constitutes the first space 74*a*, and the side nearer to the external periphery constitutes the second space 74*b*. A communicating part 74*d* for communicating the first space 74*a* with the second space 74*b* is provided to the partitioning wall 74*c* along the direction in which the partitioning wall 74*c* extends (i.e., the circumferential direction of the partitioning wall 74*c*). In the present embodiment, an example is depicted in which the communicating part 74*d* is continuously provided along the extension direction of the partitioning wall 74*c*, but configurations other than the one described above are also possible, such as one in which holes through the partitioning wall 74*c* are intermittently provided along the extension direction of which the partitioning wall 74*c*, for example.

The communicating part 74*d* can supply fluid uniformly to the second space, and can be designed so that the position, diameter, and other factors are set so that there are no local nonuniformities in the pressure of the fluid in the second space.

The fluid supplied from the fluid supply and drainage means P to the fluid retention part 74 via the fluid supply and drainage part 75 seeps through pores in the guide part 72 out to the resin film. The fluid supply and drainage part 75 and fluid retention part 74 herein constitute fluid seepage means R.

Stainless steel, aluminum, or another metal can be suitably used for the mandrel main body 71. Rubber, an adhesive, or another sealing material for bonding can be used between the mandrel main body 71 and the guide part 72. The sealing material used herein is preferably heat resistant when the mandrel 7 is heated or the like. For example, a fluororesin rubber, a silicone sealing material, or another material can be suitably used.

The guide part 72 is configured from, e.g., a porous elastic material. The porous elastic material is not particularly limited as long as it can be elastically deformed, and possible examples include various porosified organic materials, such as those based on fluorine, multipurpose resins, engineering plastics, and the like. In terms of heat resistance, it is preferable to use a porous material such as silicone rubber or another material based on silicone, cross-linked rubber, fluororesin, or another porous material based on fluorine or an engineering plastic. In cases in which the material need not greatly expand or contract, a fluororesin or another fluorine-based porous material that slides well against the tubular resin film can be suitably used. In cases in which the conditions of use necessitate a heat resistance of 150° C. or greater and a large capacity to expand and contract, it is possible to use silicone rubber or another silicone-based porous material, or a cross-linked rubber porous material or the like.

FIG. 2 shows a cross-sectional view of a mandrel 7 according to another embodiment. This mandrel can be disposed in proximity or contact with the external peripheral surface of a moving resin film to guide the movement of the resin film when, e.g., a tubular resin film of continuous form is continuously produced. As in the embodiment described above, this mandrel is substantially cylindrical in shape and has a guide part 72*a* and a mandrel main body having an opening 71*a*. In the present embodiment, the opening 71*a* is provided in the internal peripheral portion of the mandrel main body, and the guide part 72 constitutes the internal peripheral surface of the substantially cylindrical shape.

As in the embodiment described above, a fluid retention part 74 is provided in the interior of the mandrel, and also provided is a partitioning wall 74*c* for partitioning a first space 74*a* for communicating the fluid retention part 74 with the fluid supply and drainage part 75, and a second space 74*b* for communicating the fluid retention part 74 with the pores in the guide part 72. In the present embodiment, the side of the fluid retention part 74 nearer to the external periphery of the mandrel constitutes the first space 74*a*, and the side nearer to the internal periphery constitutes the second space 74*b*.

When fluid is supplied to the fluid retention part 74 via the fluid supply and drainage part 75, the pressure of the fluid in the second space 74*b* becomes greater than the external pressure, and the guide part 72 advances from the internal peripheral surface of the mandrel main body 71. When the fluid is drained from the fluid retention part 74, the guide part 72 retracts toward the internal peripheral surface of the mandrel main body.

FIG. 3 shows a cross-sectional view of the mandrel 7 according to another embodiment. This mandrel can be disposed in proximity or contact with the surface of a moving resin film to guide the movement of the resin film when, e.g., a flat resin film in continuous form is continuously produced. This mandrel has a substantially rectangular shape, wherein an opening 71*a* for providing a guide part 72 is provided to one side of the substantially rectangular mandrel main body 71. First holding parts 71*b* and second holding parts 71*c* for holding the guide part 72 to the mandrel main body are provided substantially parallel to each other along the circumferential direction of the opening 71*a*.

An internal space is formed in the mandrel interior by the mandrel main body and the guide part 72.

In each of the mandrels 7 described above, the shape and manner of expansion of the guide part 72 can be adjusted in order to obtain a specific amount of protrusion. For example, FIGS. 4(*a*) through (*c*) schematically depict the manner in which the diameter of the mandrel 7 expands (before and after expansion).

The guide part 72 can also be provided with an easily advancing and retracting structure by being formed into the shape of a bellows or the like.

[Mandrel Action]

The diameter of the mandrel 7 can be varied as a result of the advance and retraction of the guide part 72. The advancing and retracting action of the guide part 72 of the mandrel will now be described. FIG. 1(*a*) shows a state in which the pressure of the fluid in the fluid retention part 74 and the external pressure are substantially equal, and the mandrel 7 has a substantially cylindrical shape. When fluid is supplied to the first space 74*a* of the fluid retention part 74 via the fluid supply and drainage part 75, the pressure of the fluid in the first space 74*a* rises and the fluid is supplied to the second space 74b via the communicating part 74d. Therefore, the pressure of the fluid in the second space 74b is greater than the external pressure, and the guide part 72 is caused to advance while the fluid seeps out through the pores in the guide part 72, as shown in FIG. 1(b).

When fluid is drained into the first space 74a of the fluid retention part 74 via the fluid supply and drainage part 75, the pressure of fluid in the first space 74a is less than the pressure of fluid in the second space 74b, and the fluid is drained from the second space 74b into the first space 74a via the communicating part 74d. Therefore, the difference in pressure is small between the second space 74b and the exterior, and the guide part 72 retracts towards the mandrel main body 71. Furthermore, when the fluid is drained, there is no difference in pressure between the second space 74b and the exterior, and the mandrel 7 returns to the initial substantially cylindrical shape. Furthermore, when the fluid is drained, the pressure of the fluid in the second space 74b is less than the external pressure, and the guide part 72 retracts into the mandrel main body 71.

Thus, the advance and retraction deformation of the guide part 72 can be controlled by adjusting the pressure of the fluid retained in the fluid retention part 74. The fluid seepage means R may be provided separately from the region in which the advance and retraction deformation of the guide part 72 is controlled, so that the fluid can seep out even when the pressure of the fluid is less than the external pressure.

FIGS. 5(a) through (c) show the manner in which the guide part 72 is made to advance in the radial direction of the mandrel, and the tubular resin film is held while the fluid is made to seep out from the guide part 72 of the mandrel 7. FIG. 5(a) shows an example in which the tubular resin film is held from the inside, FIG. 5(b) shows an example in which the tubular resin film is held from the outside, and FIG. 5(c) shows an example in which the tubular resin film is held from both the inside and outside. Causing the fluid to seep out through the surface of the guide part 72 makes it possible to reduce friction between the resin film and the guide part 72, to prevent the film from becoming hung up, and to create a film having a satisfactory outward appearance in a stable manner.

The tubular resin film can be easily passed through by setting the guide part 72 to have a diameter somewhat smaller than that of the tubular resin film, and by causing the guide part 72 to advance to a desired diameter after the tubular resin film has passed through.

The fluid preferably has a lubricating effect for reducing friction between the guide part 72 and the resin film, and specific examples include water, a low-molecular-weight organic compound, a gas, or the like. A gas is particularly preferable because it is not likely to remain in the finished product and no step for removal is required. Air is inexpensive and is generally preferred, but nitrogen or another inert gas can be used in cases in which the resin film easily oxidizes, or the gas can be appropriately determined according to the resin film and other such factors. The fluid having this lubricating effect is hereinafter referred to as the lubricant.

[Apparatus and Method for Producing Tubular Resin Film Using Mandrel]

A production apparatus 100 and a production method for a tubular resin film using the mandrel according to the present invention will now be described.

FIG. 6 is a schematic diagram showing an example of a tubular resin film production apparatus 100 of the present invention.

The tubular resin film production apparatus 100 comprises an extrusion-molding device 50 for extrusion-molding a tubular resin film, a stretching device 60 for stretching the tubular resin film, a cutting device 90 for cutting the resin film, and a winding device 80 for winding the resin film.

[Extrusion-Molding Device and Extrusion-Molding Method]

First, the extrusion-molding device and the extrusion-molding method of the present invention will be described with reference to FIG. 6.

The extrusion-molding device 50 comprises heating extruder 1 for extruding a melted thermoplastic resin into the shape of a tube, a core member 2a that faces the inner surface of the thermoplastic resin extruded into a tube shape and that molds the thermoplastic resin into a tubular resin film while the lubricant seeps onto the inner surface, a mandrel 7a for holding the shape of the tubular resin film while kept in proximity or contact with the inner surface and/or outer surface of the molded tubular resin film via the lubricant to inhibit vibration, a conveying member 6a for conveying the tubular resin film at a constant speed, and an outside member 5a that faces the outer surface of the thermoplastic resin extruded into a tube shape and that cools the tubular resin film. The mandrel of the present invention is referred to as a variable-diameter mandrel in the following embodiment.

In the extrusion-molding device and extrusion-molding method of the present invention, the core member 2a is disposed so as to face the inner surface of the thermoplastic resin extruded into a tube shape from a metal cap 3 of the heating extruder 1, and the core member 2a molds the thermoplastic resin into a tubular resin film 20. The core member 2a is connected to a lubricant supply source (not shown), and is configured to allow a lubricant to seep onto the inner surface of the thermoplastic resin from the surface of the core member 2a, the purpose of which is to reduce the friction generated by contact between the thermoplastic resin and the core member 2a during molding, as shown in the enlarged circle P in FIG. 6. The core member 2a is configured from a porous material, for example.

Stabilization means 4 for stabilizing the shape of the thermoplastic resin extruded into a tube shape is preferably provided between the metal cap 3 of the heating extruder 1 and the core member 2a. A conventional method described in WO2004-067260 can be used as the stabilization means 4. For example, the stabilization means 4 may be a separating part provided to separate the metal cap 3 of the heating extruder 1 from the core member 2a.

The extrusion-molding device 50 preferably comprises an outside member 5a that faces the outer side of the thermoplastic resin extruded into a tube shape from the heating extruder 1 and that cools the thermoplastic resin extruded into a tube shape while gas seeps out. Since the outside member 5a faces the outer side of the thermoplastic resin extruded into the shape of a tube and cools the tubular resin film while the gas seeps out to the outer side, the film can be cooled more uniformly and more efficiently than by natural cooling, which includes many external factors. The outside member 5a is configured from a porous material, for example.

The tubular resin film 20 molded by the core member 2a and cooled is conveyed downstream by the conveying member 6a. A multipoint roller disposed in the circumferential direction on the inner surface and/or outer surface of the tubular resin film 20 can be used as the conveying member 6a. A configuration may also be used in which a multipoint roller is not used, and the film is conveyed downstream directly by a winding device 80 for winding, as described later.

For example, a variable-diameter mandrel 7a is disposed between the core member 2a and the conveying member 6a, as shown in FIGS. 6 and 8(a). The variable-diameter mandrel 7a comes into proximity or contact with the inner surface of the molded tubular resin film 20 via the lubricant and holds the shape of the tubular resin film while inhibiting vibration. In this extrusion-molding device, the mandrel is disposed downstream of the core member 2a, and can therefore hold the film and prevent vibrations in, e.g., the conveying member 6a or the like from reaching the side of the metal cap 3.

As shown in FIG. 8(b), a configuration may be used in which a variable-diameter mandrel 7d is disposed on the outer surface of the tubular resin film 20, and the tubular resin film 20 is held on both the inner side and the outer side by the variable-diameter mandrel 7a and the variable-diameter mandrel 7d. The variable-diameter mandrel 7d disposed on the outer surface of the tubular resin film 20 may also be used alone.

In the extrusion-molding device and extrusion-molding method of the present invention, the core member 2a may be configured from a variable-diameter mandrel 7g, as shown in FIGS. 15(a) and 16.

The variable-diameter mandrel 7g is disposed so as to face the inner side of the thermoplastic resin extruded into a tube shape from the metal cap 3 of the heating extruder 1, and the mandrel molds the thermoplastic resin into a tubular resin film 20. The variable-diameter mandrel 7g is configured to allow a lubricant to seep onto the inner surface of the thermoplastic resin from the surface of the variable-diameter mandrel 7g, the purpose of which is to reduce the friction generated by contact between the thermoplastic resin and the variable-diameter mandrel 7g during molding of the tubular resin film, as shown in the enlarged circle P2 in FIG. 16. Configuring the core member 2a from the variable-diameter mandrel 7g makes it possible to finely adjust the diameter of the tubular resin film by causing the guide part 72 to advance and retract.

The variable-diameter mandrel 7d may also be provided to face the variable-diameter mandrel 7g on the outer surface of the thermoplastic resin extruded into the shape of a tube, as shown in FIG. 15(b). Providing the variable-diameter mandrel 7d makes it possible to block the flow of hot air or another medium that rises across the outer side of the tubular resin film from the stretching device or other heating device provided downstream of the variable-diameter mandrel 7d, and also to prevent thickness nonuniformities and the like from forming in the tubular resin film.

[Stretching Device and Stretching Method]

Next, the stretching device and stretching method for stretching the tubular resin film will be described below with reference again to FIG. 6. A tubular resin film produced with the extrusion-molding device of the present invention can be used in this stretching device, but the stretching device can also be used to stretch a tubular resin film (not limited to being produced by the extrusion-molding device of the present invention) produced separately in advance.

The stretching device 60 comprises three variable-diameter mandrels that come into proximity or contact with the inner surface and/or outer surface of the molded tubular resin film via the lubricant to hold the shape of the tubular resin film while inhibiting vibration, two conveying members 6a, 6b for stretching the tubular resin film in the direction of advancement while conveying the film and varying the speed ratio, and three core members 2b through 2d that face the inner surface of the tubular resin film being extruded and that prevent the tubular resin film from shrinking in diameter while the lubricant seeps out onto the inner surface. The three variable-diameter mandrels are provided in a configuration of enclosing the three core members 2b through 2d. The stretching device also comprises outside members 5b, 5c for heating the tubular resin film and an outside member 5d for cooling the film.

The core members 2b through 2d are disposed to face the inner surface of the tubular resin film, and these core members prevent the tubular resin film from shrinking in diameter when the tubular resin film is stretched (the necking phenomenon), and also prevent the film from shrinking when the film is cooled. The core members 2b through 2d are configured to allow the lubricant to seep out from the surfaces thereof, similar to the core member 22a (*6). The lubricant can be adjusted in terms of the temperature and the amount that seeps out, in accordance with the type of thermoplastic resin. The core members 2b through 2d may be configured from a porous material, for example.

The core members 2b through 2d are configured from three core members, but are not limited to the configuration described above, and the number of core members can be freely adjusted.

The stretching device 60 preferably comprises outside members 5b, 5c that face the outer surface of the tubular resin film and heat the tubular resin film, and an outside member 5d that cools the film. The outside members 5b, 5c, 5d are configured from a porous material, for example. Three outside members are used in this configuration, but the number can be freely adjusted according to their use. The outside members 5b, 5c for heating the tubular resin film can be members that heat using infrared methods, or members that heat using hot air while a gas seeps out.

Multipoint rollers disposed in the circumferential direction on the inner surface and/or outer surface of the tubular resin film 20 can be used as the conveying members 6a, 6b. The tubular resin film can be stretched in the direction of film advance by varying the rotating speed of the conveying members 6a, 6b, and/or 6d. For example, when the rotating speed of the conveying member 6b is increased above that of the conveying member 6a, the tubular resin film is stretched in the direction in which the film advances.

The variable-diameter mandrels 7b through 7d come into proximity or contact with the inner surface and/or outer surface of the molded tubular resin film and hold the shape of the tubular resin film while inhibiting vibration, as shown in FIG. 6 and FIGS. 9 through 11. Disposing the variable-diameter mandrels 7b through 7d upstream and downstream of the core members 2b through 2d makes it possible fix the film in place from the inside and/or outside, and also to inhibit the film from being vibrated by the action or other effect of the core members 2b through 2d, the core member 2b, or the conveying members 6a, 6b. As a result, it is possible to reduce problems in which the tubular resin film 20 comes into contact with the ends of the core member 2b or 2d and is damaged, or problems in which heating nonuniformities cause wrinkles or sagging in the tubular resin film.

The variable-diameter mandrel 7d comes into proximity or contact with the outer surface of the tubular resin film via the lubricant, and heat from the heating devices, e.g., the outside members 5b, 5c used as stretching devices disposed downstream of the variable-diameter mandrel 7d, as well as the heating gas that seeps out from the outside members 5b, 5c, create rising air currents that function to prevent a backflow in the upstream direction. As a result, it is possible to prevent problems in which, for example, rising air currents from the outside affect the thermoplastic resin extruded into a tube shape between the metal cap 3 and the core member 2a, and cause thickness nonuniformities and phase difference nonuniformities in the subsequent tubular resin film.

In the stretching device and stretching method according to the present invention, variable-diameter mandrels 7h, 7i, 7j may be used instead of the core members 2b, 2c, 2d, as shown in FIG. 17.

The variable-diameter mandrels 7h, 7i have, e.g., a pillar shape having substantially the same diameter as the original tubular resin film, and these mandrels prevent the tubular resin film from shrinking in the radial direction while the lubricant seeps out.

A variable-diameter mandrel 7j is preferably provided to face the outside member 5d in order to suppress uneven cooling shrinkage in the stretched tubular resin film.

Using the variable-diameter mandrels 7h, 7i, 7j in place of the core members 2b, 2c, 2d in the stretching device and the stretching step makes it possible to maintain the desired extent of proximity or contact between the variable-diameter mandrels 7h, 7i, 7j and the tubular resin film, and therefore to effectively prevent stretching, shrinking, and the like in the tubular resin film.

Another possibility is a configuration in which the guide parts 72 of the variable-diameter mandrels 7h, 7i, 7j are made to advance to the diameter of the tubular resin film or farther to stretch the tubular resin film in the radial direction. This configuration makes it possible to obtain the desired stretched state by causing the guide parts 72 to advance and retract.

Another possibility is to replace the core members 2b, 2c, 2d and to perform biaxial stretching using variable-diameter mandrels 7b, 7c that have different diameters after the core member guide parts 72 have advanced, as shown in FIG. 12.

[Cutting Device and Cutting Method]

Next, the cutting device and cutting method for cutting the tubular resin film will be described below with reference to FIG. 6. The film cutting device and cutting method are not limited to using a tubular resin film produced with the extrusion-molding device and stretching device of the present invention, and can also be used to cut a tubular resin film (not limited to being produced by the extrusion-molding device of the present invention) produced separately in advance.

A cutting device 70 comprises two variable-diameter mandrels 7e, 7f that come into proximity or contact with the inner surface and/or outer surface of the molded tubular resin film via the lubricant and that hold the shape of the tubular resin film while inhibiting vibration, a cutting member for cutting the molded tubular resin film open into a flat shape, and two conveying members for conveying the tubular resin film that has been cut by the cutting member.

The cutting member 8 is disposed so that the cutting member 8 faces the direction in which the tubular resin film 20 is conveyed, for example, and the cutting member 8 can cut the tubular resin film 20 open while the tubular resin film 20 is conveyed downward. The cutting means can also be rotated to cut the tubular resin film open into a spiraling shape.

Possible examples of the cutting member 8 include a metal blade, a ceramic blade, or another contact cutting member; or a laser cutter or another non-contact cutting member or the like. Multiple cutting members 8 may also be provided.

The variable-diameter mandrel 7e is disposed upstream of the cutting member 8, while the variable-diameter mandrel 7f is disposed downstream of the cutting member 8, as shown in FIGS. 13(b) and 14. The variable-diameter mandrels 7e, 7f expand to a specific diameter from a diameter equal to or less than the inside diameter of the tubular resin film while the lubricant seeps out from the variable-diameter mandrels, and the mandrels come into proximity or contact with the inner surface and/or outer surface of the uncut molded tubular resin film via the lubricant to hold the shape of the tubular resin film while inhibiting vibration. These variable-diameter mandrels 7e, 7f stabilize the behavior of the tubular resin film 20 while the film is conveyed, and also reduce the possibility of the film becoming hung up on the cutting member due to the film vibrating when the film is being cut by the cutting member, making it possible to more reliably and stably cut the tubular resin film 20.

The variable-diameter mandrel 7e or 7f alone may be provided as shown in FIG. 13(a).

Variable-diameter mandrels 7 may be disposed solely on the inner surface or outer surface of the tubular resin film, or mandrels may be disposed on both the inner and outer surfaces.

The sheet-shaped film created by being cut open by the cutting device 70 is finally wound by the winding device 80. The winding device 80 must be linked with the cutting member 8 so that the film does not become twisted. Specifically, the winding device 80 must be fixed in place in cases in which the cutting member 8 is fixed in place, and the winding device 80 must rotatably move in alignment with the cutting member 8 in cases in which the cutting member moves while rotating. If the winding device 80 and the cutting device 70 are integrated together, either configuration can be used because the tubular resin film 20 can be wound without modification when the film is cut. An example of the winding device 80 is one configured from a conveying member 6d that conveys the film while rotating a long, thin paper tube and winding up the film.

The tubular resin film production apparatus 100 may also comprise internal pressure adjustment means 9, as shown in FIG. 7. Providing internal pressure adjustment means 9 makes it possible to adjust the internal pressure of the tubular resin film to a desired value, and the internal pressure can therefore be prevented from increasing even in cases in which the lubricant seeping out from the surfaces of the core member 2 and the mandrel 7 flows into the area between the metal cap 3 and the core member 2a (the area of the stabilization means 4) or the stretching and cooling areas of the core members 2b, 2c.

An example of the internal pressure adjustment means is one that can allow communication with external air via ventilation means 9a that extends from the metal cap 3 to the heating extruder 1, and ventilation means 9b provided to the core member 2a, as shown in FIGS. 7(a), (b). In cases in which the variable-diameter mandrel 7a and the stretching and cutting devices are used together, ventilation means 9c through 9h can be provided to pass through, e.g., the core members 2b through 2d and the variable-diameter mandrels 7b, 7c, 7e, 7f used in each device, and the ventilation means can allow communication between the outside air and the area between the metal cap 3 and the core member 2a (the area of the stabilization means 4), or the cooling and stretching areas of the core members 2b, 2c.

In tube extrusion that uses a conventional core member to hold and stretch the film shape, sufficient consideration has not been given to holding the shape before and after the core member. Therefore, in the case of a particularly thin film, the film is unstable and undergoes damage, and the effect of the unsteadiness reaches unstable areas of considerable film thickness variations and increases film thickness nonuniformities and retardation nonuniformities, making it difficult to stably produce a film at a level at which the film can be used as an optical film, or an extremely thin film having a thickness of 50 μm or less. However, the variable-diameter mandrel 7 can completely resolve these problems. In other words, the necessary amount of lubricant can be made to seep out to only the necessary portions to hold or stretch the shape of the film without creating damage while greatly inhibiting increases in the internal pressure of the tube.

The sheet-shaped film obtained from the tubular resin film of the present invention in the manner described above can be suitably used as a retardation film because the film can be endowed with excellent orientation. The retardation film can be used to improve the reduction in the visible angle caused by the double refraction of the liquid crystals in a liquid crystal display element or other device that uses TV, VA, or STN orientation. Generally, the retardation film causes color irregularities in the liquid crystal display device when nonuniformities in the slow axis angle exceed ±3 degrees, but in the sheet-shaped film obtained by the present invention, the slow axis angle has a nonuniformity of less than ±3 degrees in the width direction of the film, resulting in excellent display quality.

In retardation film produced by stretching based on conventional tentering, only the middle portion of the film can be used because of the large nonuniformities in the slow axis angle in the ends. In the present invention, however, the entire width of the film can be used because the resin film is stretched while still in a tube shape. Therefore, the yield rate can be improved and production costs greatly reduced.

Possible examples of a thermoplastic resin that can be used in the present invention include polyethylene, polypropylene, polystyrene, polycarbonate, polyester, polyarylate, polyamide, a cyclic polyolefin, an ethylene vinyl alcohol copolymer, polyether sulfone, and the like. These resins may be used singly, or a polymer blend or copolymer containing two or more of these resins may be used. Derivatives or conversion products of these resins may also be used.

Particularly in cases in which the thermoplastic resin film obtained from the tubular resin film in the present invention is used as a retardation film provided to a liquid crystal display (LCD) or the like such as is described above, the resin material is preferably a material that can guarantee high dimensional stability (for example, uniform thickness) and optical stability (for example, uniform retardation) without being affected by heat and/or moisture; a material that has a high glass transition temperature (Tg) (for example, 120° C. or greater) so as to withstand the heat from the backlight of the liquid crystal display device; or a material that has an excellent transmitting capacity of visible light so that a satisfactory liquid crystal display can be obtained. The thermoplastic resin film may be unstretched, or may be uniaxially or biaxially stretched. Alternatively, a discotic liquid crystal polymer or a nematic liquid crystal polymer or the like may be coated and oriented over the thermoplastic resin film.

The retardation film requires mechanical stability so that the retardation value does not change until the display is assembled, and the photoelastic coefficient of the film therefore preferably has an absolute value of $1.0 \times 10^{-11}$ $Pa^{-1}$ or less. For a thermoplastic resin that fulfills these characteristics, it is particularly preferable to use a norbornene-based polymer, an olefin maleimide copolymer, or another such cyclic polyolefin. Examples of a norbornene-based polymer include a homopolymer composed of a norbornene-based monomer, or a hydrogenation product thereof, or a copolymer of a norbornene-based monomer and a vinyl compound, or a hydrogenation product thereof. Examples of specific products include "ARTON" (made by JSR), "Zeonoa," "Zeonics" (made by Zeon of Japan), "Apel" (made by Mitsubishi Chemicals), "Topas" (made by Ticona), and the like. Examples of the olefin maleimide copolymer include "OPN" and "OPP" (made by Tosoh Corporation) and the like.

A small amount of an antioxidant, a colorant, dye, pigment, inorganic filler, coupling agent, or other additive may be added to the thermoplastic resin to an extent that does not affect the properties (glass transition temperature, light permeation, and the like) of the resin. Examples of the antioxidant include a phenol-based antioxidant, a phosphoric acid-based antioxidant, a sulfur-based antioxidant, a lactone-based antioxidant, a hindered amine light stabilizer (HALS), and the like. Particularly, a phenol-based antioxidant is suitable for use in a resin for a retardation film in terms of thermal stability and compatibility. Specific examples of the phenol-based antioxidant include pentaerythritol tetrakis[3-(3,5-di-t-butyl-4-hydroxyphenyl)propionate] (ex: product name "Irganox 1010" (made by Chiba Specialty Chemicals)), octadecyl-3-(3,5-di-t-butyl-4-hydroxyphenyl)propionate (ex: product name "Irganox 1076" (made by Chiba Specialty Chemicals)), 3,3',3",5,5'5"-hexa-t-butyl-a,a',a"-(mesitylene-2,4,6,-toluoyl)tri-p-cresol (ex: product name "Irganox 1330" (made by Chiba Specialty Chemicals)), 1,3,5-tris(3,5-di-t-butyl-4-hydroxybenzyl)-1,3,5-triazine-2,4,6(1H,3H,5H)-trione (ex: product name "Irganox 3114" (made by Chiba Specialty Chemicals)), 3,9-bis{2-[3-(3-t-butyl-4-hydroxy-5-methylphenyl)propionyloxy]-1,1-dimethylethyl}-2,4,8,10-tetraoxaspiro[5,5]undecane (ex: product name "Adekastab AO-80" (made by Asahi Denka Co., Ltd.), and the like. These phenol-based antioxidants may be used singly, or two or more may be used together.

EXAMPLES

Specific examples are given hereinbelow to describe the present invention. Examples 1 through 5 and Comparative Examples 1 through 3 are examples of using the tubular resin film production apparatus 100 shown in FIG. 6. In Examples 1 through 5 and Comparative Examples 1 through 3, the various properties of the tubular resin film production apparatus and the tubular resin film common to each example are measured in the following manner.

(1) Temperature of Tubular Resin Film Production Apparatus

A K-thermocouple (AM-7002) made by Anritsu was used. The K-thermocouple was affixed to a specific region on the tubular resin film production apparatus to take measurements.

(2) Amount of Gas Seepage

A FLOLINE SEF-52 made by STEC INC was used to take measurements.

(3) Internal Pressure and Fluctuation of Internal Pressure in Tubular Resin Film A fine differential pressure sensor head (AP-47) made by Keyence was used to measure the pressure difference between the inside and outside of a tubular resin film as the internal pressure. The difference between maximum and minimum values of the internal pressure that varied over time was calculated as the fluctuation of internal pressure.

(4) Film Thickness

A film inspector (TS-0600AS2) made by TES was used. First, the film thickness was measured across the entire width of the film at 1 mm intervals in the TD direction, and then these measurements were repeated 200 times in the MD direction. An average was calculated from the entire data set, and the corresponding ratio of differences between the maximum and minimum values of the entire data set was displayed as thickness nonuniformity and expressed in percent.

(5) Retardation and Slow Axis in the Film

A KOBRA-21ADH made by Oji Scientific Instruments was used. First, the retardation and slow axis in the film were measured across the entire film width at 20 mm intervals in the TD direction, and then these measurements were repeated 50 times in the MD direction. The average was calculated from the entire data set, and the corresponding ratio of the differences between the maximum and minimum values of the entire data set was displayed as retardation nonuniformity and expressed in percent. The range of variation in the entire data set for slow axis nonuniformities was calculated and displayed as ° (degrees).

(6) Outward Appearance of the Film

The entire surfaces on the front and back of a film of about 100 m were observed with the naked eye, and the presence or absence of damage, wrinkles, and undulations was confirmed.

ARTON D4531 (Tg=135° C.; made by JSR) and Topas 6013 (Tg=140° C.; made by Ticona) were used as the raw material for the film.

The tubular resin film production apparatus 100 shown in FIG. 16 was used in Examples 1 through 5 and Comparative Examples 1 through 3.

An extruder having the following configuration was used for the heating extruder 1.

Barrel diameter: 50 mm, screw shape: full-flight uniaxial type, L/D: 25, filter mesh size: 5 μm, mode: spiral mode A metal cap having the following configuration was used for the metal cap 3.

Nozzle shape: parallel nozzle, aperture: 350 mm

Core members having the following configuration were used as the core members 2a, 2b, 2c.

Material: porous powdered sintered metal, outside diameter: 340 mm, length: 200 mm A core member having the following configuration was used as the core member 2d.

Material: porous powdered sintered metal, outside diameter: 340 mm, length: 100 mm Outside members having the following configuration were used as the outside members 5a, 5b, 5c.

Material: sintered wire net, inside diameter: 360 mm, length 200 mm

An outside member having the following configuration was used as the outside member 5d.

Material: sintered wire net, inside diameter 360 mm, length 100 mm

Mandrels having the following configuration were used for the variable-diameter mandrels 7a, 7b, 7c, 7d, 7e, 7f.

Material: powdered and sintered fluororesin (PTFE), initial outside diameter: 330 mm, length: 100 mm Conveying members having the following configuration were used for the conveying members 6a, 6b.

Type: multipoint rollers

A cutting member having the following configuration was used for the cutting member 8.

Type: contact metal blade

The tubular resin film production apparatus 100 shown in FIG. 16 was used in Examples 6 through 8 and Comparative Examples 4, 5. Except for the conditions shown below, the conditions were the same as those in the examples and comparative examples described above.

An extruder having the following configuration was used for the heating extruder 1.

Mandrels having the following configuration were used for the variable-diameter mandrels 7a, 7b, 7c, 7d, 7e, 7f.

Material: powdered and sintered fluororesin (PTFE), initial outside diameter: 330 mm, length: 100 mm The tubular resin film production apparatus 100 shown in FIG. 17 was used in Examples 9 through 11 and Comparative Example 6. Except for the conditions shown below, the same conditions as those described above were used.

An extruder having the following configuration was used for the heating extruder 1.

Mandrels having the following configuration were used for the variable-diameter mandrels 7a, 7b, 7c, 7d, 7e, 7f, 7h, 7i, 7j.

Material: powdered and sintered fluororesin (PTFE), initial outside diameter: 330 mm, length: 100 mm The device configurations, production conditions, and resins used in the examples are shown in Tables 1 through 3. The device configurations, production conditions, and resins used in the comparative examples are shown in Tables 4 through 6. The characteristics of the films created in the examples and comparative examples are shown in Tables 7 through 9.

TABLE 1

|  |  |  | Example 1 | Example 2 | Example 3 | Example 4 | Example 5 |
|---|---|---|---|---|---|---|---|
| sExtrusion-molding device 50 | Heating extruder 1 | Temp. (° C.) | 235 | 235 | 235 | 235 | 235 |
|  | Metal cap 3 | Temp. (° C.) | 235 | 235 | 235 | 235 | 235 |
|  | Core member 2a | Temp. (° C.) | 150 | 150 | 150 | 150 | 150 |
|  |  | Lubricant | Air | Air | Air | Air | Air |
|  |  | Amount of lubricant (L/min) | 50 | 50 | 50 | 50 | 50 |
|  |  | Distance between 2a-3 | 12 | 12 | 12 | 12 | 12 |
|  |  | Pressure (kPa) between 2a-3 | 0.02 | 0.02 | 0.02 | 0.02 | 0.02 |
|  |  | Pressure fluctuation (kPa) between 2a-3 | <0.02 | <0.02 | <0.02 | <0.02 | <0.02 |
|  | Stabilization means 4 | Type | Separated | Separated | Separated | Separated | Separated |
|  | Outside member 5a | Temp. | Room temp. | Room temp. | Room temp. | Room temp. | Room temp. |
|  |  | Gas seepage | Yes | Yes | Yes | Yes | Yes |
|  |  | Amount of gas (L/min) | 200 | 200 | 200 | 200 | 200 |
|  |  | Distance (mm) | 25 | 25 | 25 | 25 | 25 |

TABLE 1-continued

|  |  |  |  | Example 1 | Example 2 | Example 3 | Example 4 | Example 5 |
|---|---|---|---|---|---|---|---|---|
|  |  |  | between 5a-3 |  |  |  |  |  |
|  |  | Variable-diameter mandrel 7a | Lubricant | Air | Air | Air | Air | Air |
|  |  |  | Radial expansion | Yes | Yes | Yes | Yes | Yes |
|  | Stretching device 60 | Conveying member 6a | Peripheral velocity (m/min) | 1.5 | 1.5 | 1.5 | 1.5 | 1.5 |
|  |  | Core member 2b | Temp. (° C.) | — | — | 150 | 150 | 150 |
|  |  |  | Lubricant | — | — | Air | Air | Air |
|  |  |  | Amount of lubricant (L/min) | — | — | 50 | 50 | 50 |
|  |  | Core member 2c | Temp. (° C.) | — | — | 150 | 150 | 150 |
|  |  |  | Lubricant | — | — | Air | Air | Air |
|  |  |  | Amount of lubricant (L/min) | — | — | 50 | 50 | 50 |
|  |  | Core member 2d | Temp. (° C.) | — | — | 100 | 100 | 100 |
|  |  |  | Lubricant | — | — | Air | Air | Air |
|  |  |  | Amount of lubricant (L/min) | — | — | 50 | 50 | 50 |
|  |  | Variable-diameter mandrel 7b | Lubricant | — | — | Air | Air | Air |
|  |  |  | Radial expansion | — | — | Yes | Yes | Yes |
|  |  | Variable-diameter mandrel 7c | Lubricant | — | — | Air | Air | Air |
|  |  |  | Radial expansion | — | — | Yes | Yes | Yes |
|  |  | Outside member 5b | Temp. (° C.) | — | — | 155 | 155 | 155 |
|  |  |  | Gas | — | — | Air | Air | Air |
|  |  |  | Amount of gas (L/min) | — | — | 400 | 400 | 400 |
|  |  | Outside member 5c | Temp. (° C.) | — | — | 155 | 155 | 155 |
|  |  |  | Gas | — | — | Air | Air | Air |
|  |  |  | Amount of gas (L/min) | — | — | 200 | 200 | 200 |
|  |  | Outside member 5d | Temp. | — | — | Room temp. | Room temp. | Room temp. |
|  |  |  | Gas | — | — | Air | Air | Air |
|  |  |  | Amount of gas (L/min) | — | — | 200 | 200 | 200 |
| Cutting device 90 |  | Conveying member 6b | Peripheral velocity (m/min) | 1.5 | 1.5 | 2.1 | 2.1 | 2.1 |
|  |  | Variable-diameter mandrel 7d | Lubricant | Air | Air | Air | Air | Air |
|  |  |  | Radial expansion | Yes | Yes | Yes | Yes | Yes |
|  |  | Variable-diameter mandrel 7f | Lubricant | Air | Air | Air | Air | Air |
|  |  |  | Radial expansion | Yes | Yes | Yes | Yes | Yes |
|  |  | Cutting member 8 | Blade insertion angle | Parallel to film-advancing direction | Parallel to film-advancing direction | Parallel to film-advancing direction | Parallel to film-advancing direction | 45° to film-advancing direction |
|  |  |  | Rotating | No | No | No | No | Yes |
|  |  | Conveying member 6c | Peripheral velocity (m/min) | 1.5 | 1.5 | 2.1 | 2.1 | 2.1 |
| Winding device 80 |  | Conveying member 6d | Type | Winding device | Winding device | Winding device | Winding device | Winding device |
|  |  |  | Winding speed (m/min) | 1.5 | 1.5 | 2.1 | 2.1 | 2.1 |
|  |  | Resin used |  | ARTON D4531 | TOPAS6013 | ARTON D4531 | TOPAS6013 | ARTON D4531 |

TABLE 2

|  |  |  | Example 6 | Example 7 | Example 8 |
|---|---|---|---|---|---|
| Extrusion-molding device 50 | Heating extruder 1 | Temp. (° C.) | 235 | 235 | 235 |
|  | Metal cap 3 | Temp. (° C.) | 235 | 235 | 235 |
|  | Variable- | Temp. (° C.) | 150 | 150 | 150 |

TABLE 2-continued

|  |  |  | Example 6 | Example 7 | Example 8 |
|---|---|---|---|---|---|
|  | diameter mandrel 7g | Lubricant | Air | Air | Air |
|  |  | Amount of lubricant (L/min) | 50 | 50 | 50 |
|  |  | Distance between 7g-3 | 12 | 12 | 12 |
|  |  | Pressure (kPa) between 7g-3 | 0.02 | 0.02 | 0.02 |
|  |  | Pressure fluctuation (kPa) between 7g-3 | <0.02 | <0.02 | <0.02 |
|  |  | Radial expansion | Yes | Yes | Yes |
|  | Stabilization means 4 | Type | Separated | Separated | Separated |
|  | Outside member 5a | Temp. | Room temp. | Room temp. | Room temp. |
|  |  | Gas seepage | Yes | Yes | Yes |
|  |  | Amount of gas (L/min) | 200 | 200 | 200 |
|  |  | Distance (mm) between 5a-3 | 25 | 25 | 25 |
|  | Variable-diameter mandrel 7a | Lubricant | Air | Air | Air |
|  |  | Radial expansion | Yes | Yes | Yes |
| Stretching device 60 | Conveying member 6a | Peripheral velocity (m/min) | 1.5 | 1.5 | 1.5 |
|  | Core member 2b | Temp. (° C.) | — | — | 150 |
|  |  | Lubricant | — | — | Air |
|  |  | Amount of lubricant (L/min) | — | — | 50 |
|  | Core member 2c | Temp. (° C.) | — | — | 150 |
|  |  | Lubricant | — | — | Air |
|  |  | Amount of lubricant (L/min) | — | — | 50 |
|  | Core member 2d | Temp. (° C.) | — | — | 100 |
|  |  | Lubricant | — | — | Air |
|  |  | Amount of lubricant (L/min) | — | — | 50 |
|  | Variable-diameter mandrel 7b | Lubricant | — | — | Air |
|  |  | Radial expansion | — | — | Yes |
|  | Variable-diameter mandrel 7c | Lubricant | — | — | Air |
|  |  | Radial expansion | — | — | Yes |
|  | Outside member 5b | Temp. (° C.) | — | — | 155 |
|  |  | Gas | — | — | Air |
|  |  | Amount of gas (L/min) | — | — | 400 |
|  | Outside member 5c | Temp. (° C.) | — | — | 155 |
|  |  | Gas | — | — | Air |
|  |  | Amount of gas (L/min) | — | — | 200 |
|  | Outside member 5d | Temp. | — | — | Room temp. |
|  |  | Gas | — | — | Air |
|  |  | Amount of gas (L/min) | — | — | 200 |
| Cutting device 90 | Conveying member 6b | Peripheral velocity (m/min) | 1.5 | 1.5 | 2.1 |
|  | Variable-diameter mandrel 7d | Lubricant | Air | Air | Air |
|  |  | Radial expansion | Yes | Yes | Yes |
|  | Variable-diameter mandrel 7f | Lubricant | Air | Air | Air |
|  |  | Radial expansion | Yes | Yes | Yes |
|  | Cutting member 8 | Blade insertion angle | Parallel to film-advancing direction | Parallel to film-advancing direction | Parallel to film-advancing direction |
|  |  | Rotating | No | No | No |
|  | Conveying member 6c | Peripheral velocity | 1.5 | 1.5 | 2.1 |

TABLE 2-continued

|  |  |  | Example 6 | Example 7 | Example 8 |
|---|---|---|---|---|---|
| Winding device 80 | Conveying member 6d | (m/min) Type | Winding device | Winding device | Winding device |
|  |  | Winding speed (m/min) | 1.5 | 1.5 | 2.1 |
|  | Resin used |  | ARTON D4531 | TOPAS6013 | ARTON D4531 |

TABLE 3

|  |  |  | Example 9 | Example 10 | Example 11 |
|---|---|---|---|---|---|
| Extrusion-molding device 50 | Heating extruder 1 | Temp. (° C.) | 235 | 235 | 235 |
|  | Metal cap 3 | Temp. (° C.) | 235 | 235 | 235 |
|  | Core member 2a | Temp. (° C.) | 150 | 150 | 150 |
|  |  | Lubricant | Air | Air | Air |
|  |  | Amount of lubricant (L/min) | 50 | 50 | 50 |
|  |  | Distance between 2a-3 | 12 | 12 | 12 |
|  |  | Pressure (kPa) between 2a-3 | 0.02 | 0.02 | 0.02 |
|  |  | Pressure fluctuation (kPa) between 2a-3 | <0.02 | <0.02 | <0.02 |
|  | Stabilization means 4 | Type | Separated | Separated | Separated |
|  | Outside member 5a | Temp. | Room temp. | Room temp. | Room temp. |
|  |  | Gas seepage | Yes | Yes | Yes |
|  |  | Amount of gas (L/min) | 200 | 200 | 200 |
|  |  | Distance (mm) between 5a-3 | 25 | 25 | 25 |
|  | Variable-diameter mandrel 7a | Lubricant | Air | Air | Air |
|  |  | Radial expansion | Yes | Yes | Yes |
| Stretching device 60 | Conveying member 6a | Peripheral velocity (m/min) | 1.5 | 1.5 | 1.5 |
|  | Variable-diameter mandrel 7h | Temp. (° C.) | 150 | 150 | 150 |
|  |  | Lubricant | Air | Air | Air |
|  |  | Amount of lubricant (L/min) | 50 | 50 | 50 |
|  |  | Radial expansion | Yes | Yes | Yes |
|  | Variable-diameter mandrel 7i | Temp. (° C.) | 150 | 150 | 150 |
|  |  | Lubricant | Air | Air | Air |
|  |  | Amount of lubricant (L/min) | 50 | 50 | 50 |
|  |  | Radial expansion | Yes | Yes | Yes |
|  | Variable-diameter mandrel 7j | Temp. (° C.) | 100 | 100 | 100 |
|  |  | Lubricant | Air | Air | Air |
|  |  | Amount of lubricant (L/min) | 50 | 50 | 50 |
|  |  | Radial expansion | Yes | Yes | Yes |
|  | Variable-diameter mandrel 7b | Lubricant | Air | Air | Air |
|  |  | Radial expansion | Yes | Yes | Yes |
|  | Variable-diameter mandrel 7c | Lubricant | Air | Air | Air |
|  |  | Radial expansion | Yes | Yes | Yes |
|  | Outside member 5b | Temp. (° C.) | 155 | 155 | 155 |
|  |  | Gas | Air | Air | Air |
|  |  | Amount of gas (L/min) | 400 | 400 | 400 |
|  | Outside | Temp. (° C.) | 155 | 155 | 155 |

TABLE 3-continued

|  |  |  | Example 9 | Example 10 | Example 11 |
|---|---|---|---|---|---|
| Cutting device 90 |  | member 5c Gas | Air | Air | Air |
|  |  | Amount of gas (L/min) | 200 | 200 | 200 |
|  | Outside member 5d | Temp. | Room temp. | Room temp. | Room temp. |
|  |  | Gas | Air | Air | Air |
|  |  | Amount of gas (L/min) | 200 | 200 | 200 |
|  | Conveying member 6b | Peripheral velocity (m/min) | 2.1 | 2.1 | 2.1 |
|  | Variable-diameter mandrel 7d | Lubricant | Air | Air | Air |
|  |  | Radial expansion | Yes | Yes | Yes |
|  | Variable-diameter mandrel 7f | Lubricant | Air | Air | Air |
|  |  | Radial expansion | Yes | Yes | Yes |
|  | Cutting member 8 | Blade insertion angle | Parallel to film-advancing direction | Parallel to film-advancing direction | 45° to film-advancing direction |
|  |  | Rotating | No | No | Yes |
|  | Conveying member 6c | Peripheral velocity (m/min) | 2.1 | 2.1 | 2.1 |
| Winding device 80 | Conveying member 6d | Type | Winding device | Winding device | Winding device |
|  |  | Winding speed (m/min) | 2.1 | 2.1 | 2.1 |
|  | Resin used |  | ARTON D4531 | TOPAS6013 | ARTON D4531 |

TABLE 4

|  |  |  | Comparative Example 1 | Comparative Example 2 | Comparative Example 3 |
|---|---|---|---|---|---|
| Extrusion-molding device 50 | Heating extruder 1 | Temp. (° C.) | 235 | 235 | 235 |
|  | Metal cap 3 | Temp. (° C.) | 235 | 235 | 235 |
|  | Core member 2a | Temp. (° C.) | 150 | 150 | 50 |
|  |  | Lubricant | Air | Air | Air |
|  |  | Amount of lubricant (L/min) | 50 | 50 | 50 |
|  |  | Distance between 2a-3 | 12 | 12 | 70 |
|  |  | Pressure (kPa) between 2a-3 | 0.02 | 0.02 | 0.11 |
|  |  | Pressure fluctuation (kPa) between 2a-3 | <0.02 | <0.02 | 0.09 |
|  | Stabilization means 4 | Type | Separated | Separated | Separated |
|  | Outside member 5a | Temp. | Room temp. | Room temp. | Room temp. |
|  |  | Gas seepage | Yes | Yes | Yes |
|  |  | Amount of gas (L/min) | 200 | 200 | 200 |
|  |  | Distance (mm) between 5a-3 | 25 | 25 | 110 |
|  | Variable-diameter mandrel 7a | Lubricant | Air | Air | Air |
|  |  | Radial expansion | No | No | No |
| Stretching device 60 | Conveying member 6a | Peripheral velocity (m/min) | 1.5 | 1.5 | 1.5 |
|  | Core member 2b | Temp. (° C.) | — | 150 | — |
|  |  | Lubricant | — | — | — |
|  |  | Amount of lubricant (L/min) | — | Air | — |
|  | Core member | Temp. (° C.) | — | 50 | — |

TABLE 4-continued

|  |  |  | Comparative Example 1 | Comparative Example 2 | Comparative Example 3 |
|---|---|---|---|---|---|
|  | 2c | Lubricant | — | 150 | — |
|  |  | Amount of lubricant (L/min) | — | Air | — |
|  | Core member 2d | Temp. (° C.) | — | 50 | — |
|  |  | Lubricant | — | 100 | — |
|  |  | Amount of lubricant (L/min) | — | Air | — |
|  | Variable-diameter mandrel 7b | Lubricant | — | 50 | — |
|  |  | Radial expansion | — | No | — |
|  | Variable-diameter mandrel 7c | Lubricant | — | Air | — |
|  |  | Radial expansion | — | No | — |
|  | Outside member 5b | Temp. (° C.) | — | 155 | — |
|  |  | Gas | — | Air | — |
|  |  | Amount of gas (L/min) | — | 400 | — |
|  | Outside member 5c | Temp. (° C.) | — | 155 | — |
|  |  | Gas | — | Air | — |
|  |  | Amount of gas (L/min) | — | 200 | — |
|  | Outside member 5d | Temp. | — | Room temp. | — |
|  |  | Gas | — | Air | — |
|  |  | Amount of gas (L/min) | — | 200 | — |
| Cutting device 90 | Conveying member 6b | Peripheral velocity (m/min) | 1.5 | 2.1 | 1.5 |
|  | Variable-diameter mandrel 7d | Lubricant | Air | Air | Air |
|  |  | Radial expansion | No | No | No |
|  | Variable-diameter mandrel 7f | Lubricant | Air | Air | Air |
|  |  | Radial expansion | No | No | No |
|  | Cutting member 8 | Blade insertion angle | Parallel to film-advancing direction | Parallel to film-advancing direction | Parallel to film-advancing direction |
|  |  | Rotating | No | No | No |
|  | Conveying member 6c | Peripheral velocity (m/min) | 1.5 | 2.1 | 1.5 |
| Winding device 80 | Conveying member 6d | Type | Winding device | Winding device | Winding device |
|  |  | Winding speed (m/min) | 1.5 | 2.1 | 2.1 |
|  | Resin used |  | ARTON D4531 | ARTON D4531 | ARTON D4531 |

TABLE 5

|  |  |  | Comparative Example 4 | Comparative Example 5 |
|---|---|---|---|---|
| Extrusion-molding device 50 | Heating extruder 1 | Temp. (° C.) | 235 | 235 |
|  | Metal cap 3 | Temp. (° C.) | 235 | 235 |
|  | Variable-diameter mandrel 7g | Temp. (° C.) | 150 | 150 |
|  |  | Lubricant | Air | Air |
|  |  | Amount of lubricant (L/min) | 50 | 50 |
|  |  | Distance between 7g-3 | 12 | 12 |
|  |  | Pressure (kPa) between 7g-3 | 0.02 | 0.02 |
|  |  | Pressure fluctuation (kPa) between 7g-3 | <0.02 | <0.02 |
|  |  | Radial expansion | No | No |
|  | Stabilization means 4 | Type | Separated | Separated |
|  | Outside member | Temp. | Room temp. | Room temp. |

TABLE 5-continued

|  |  |  | Comparative Example 4 | Comparative Example 5 |
|---|---|---|---|---|
| Stretching device 60 | 5a | Gas seepage | Yes | Yes |
|  |  | Amount of gas (L/min) | 200 | 200 |
|  |  | Distance (mm) between 5a-3 | 25 | 25 |
|  | Variable-diameter mandrel 7a | Lubricant | Air | Air |
|  |  | Radial expansion | No | No |
|  | Conveying member 6a | Peripheral velocity (m/min) | 1.5 | 1.5 |
|  | Core member 2b | Temp. (° C.) | — | 150 |
|  |  | Lubricant | — | Air |
|  |  | Amount of lubricant (L/min) | — | 50 |
|  | Core member 2c | Temp. (° C.) | — | 150 |
|  |  | Lubricant | — | Air |
|  |  | Amount of lubricant (L/min) | — | 50 |
|  | Core member 2d | Temp. (° C.) | — | 100 |
|  |  | Lubricant | — | Air |
|  |  | Amount of lubricant (L/min) | — | 50 |
|  | Variable-diameter mandrel 7b | Lubricant | — | Air |
|  |  | Radial expansion | — | No |
|  | Variable-diameter mandrel 7c | Lubricant | — | Air |
|  |  | Radial expansion | — | No |
|  | Outside member 5b | Temp. (° C.) | — | 155 |
|  |  | Gas | — | Air |
|  |  | Amount of gas (L/min) | — | 400 |
|  | Outside member 5c | Temp. (° C.) | — | 155 |
|  |  | Gas | — | Air |
|  |  | Amount of gas (L/min) | — | 200 |
|  | Outside member 5d | Temp. | — | Room temp. |
|  |  | Gas | — | Air |
|  |  | Amount of gas (L/min) | — | 200 |
| Cutting | Conveying member 6b | Peripheral velocity (m/min) | 1.5 | 2.1 |
|  | Variable-diameter mandrel 7d | Lubricant | Air | Air |
|  |  | Radial expansion | Yes | No |
|  | Variable-diameter mandrel 7f | Lubricant | Air | Air |
|  |  | Radial expansion | Yes | No |
|  | Cutting member 8 | Blade insertion angle | Parallel to film-advancing direction | Parallel to film-advancing direction |
|  |  | Rotating | No | No |
|  | Conveying member 6c | Peripheral velocity (m/min) | 1.5 | 2.1 |
| Winding device 80 | Conveying member 6d | Type | Winding device | Winding device |
|  |  | Winding speed (m/min) | 1.5 | 2.1 |
|  | Resin used |  | ARTON D4531 | ARTON D4531 |

TABLE 6

|  |  |  | Comparative Example 6 |
|---|---|---|---|
| Extrusion-molding device 50 | Heating extruder 1 | Temp. (° C.) | 235 |
|  | Metal cap 3 | Temp. (° C.) | 235 |
|  | Core member 2a | Temp. (° C.) | 150 |
|  |  | Lubricant | Air |
|  |  | Amount of lubricant (L/min) | 50 |
|  |  | Distance between 2a-3 | 12 |
|  |  | Pressure (kPa) between 2a-3 | 0.02 |
|  |  | Pressure fluctuation (kPa) | <0.02 |

TABLE 6-continued

|  |  |  | Comparative Example 6 |
|---|---|---|---|
|  | Stabilization means 4 Outside member 5a |  between 2a-3 Type Temp. Gas seepage Amount of gas (L/min) Distance (mm) between 5a-3 | Separated Room temp. YES 200 25 |
| stretching device 60 | Variable-diameter mandrel 7a Conveying member 6a Variable-diameter mandrel 7h | Lubricant Radial expansion Peripheral velocity (m/min) Temp. (° C.) Lubricant Amount of lubricant (L/min) Radial expansion | AIR NO 1.5 150 AIR 50 NO |
|  | Variable-diameter mandrel 7i | Temp. (° C.) Lubricant Amount of lubricant (L/min) Radial expansion | 150 AIR 50 NO |
|  | Variable-diameter mandrel 7j | Temp. (° C.) Lubricant Amount of lubricant (L/min) Radial expansion | 100 AIR 50 NO |
|  | Variable-diameter mandrel 7b Variable-diameter mandrel 7c Outside member 5b | Lubricant Radial expansion Lubricant Radial expansion Temp. (° C.) Gas Amount of gas (L/min) | AIR NO AIR NO 155 AIR 400 |
|  | Outside member 5c | Temp. (° C.) Gas Amount of gas (L/min) | 155 AIR 200 |
|  | Outside member 5d | Temp. Gas Amount of gas (L/min) | Room temp. Air 200 |
| Cutting device 90 | Conveying member 6b Variable-diameter mandrel 7d Variable-diameter mandrel 7f Cutting member 8 Conveying member 6c | Peripheral velocity (m/min) Lubricant Radial expansion Lubricant Radial expansion Blade insertion angle Rotating Peripheral velocity (m/min) | 2.1 Air No Air No Parallel to film-advancing direction No 2.1 |
| Winding device 80 | Conveying member 6d Resin used | Type Winding speed (m/min) | Winding device 2.1 ARTON D4531 |

TABLE 7

|  |  | Example 1 | Example 2 | Example 3 | Example 4 | Example 5 | CE 1 | CE 2 | CE 3 |
|---|---|---|---|---|---|---|---|---|---|
| Thickness | Average thickness (μm) | 117.6 | 117.7 | 84.0 | 84.1 | 84.0 | 117.6 | 80.0 | 117.6 |
|  | Thickness nonuniformities (%) | <±1.0 | <±1.0 | <±1.0 | <±1.0 | <±1.0 | ±1.6 | ±1.9 | ±2< |
| Retardation | Retardation nonuniformities (%) | — | — | <±1.0 | <±1.0 | <±1.0 | — | ±2.0 | — |
|  | Slow axis nonuniformities (°) | — | — | <±1.0 | <±1.0 | <±1.0 | — | ±1.2 | — |
| Outward Appearance | Damage | No | No | No | No | No | Yes | Yes | Yes |
|  | Wrinkles | No | No | No | No | No | Yes | Yes | Yes |
|  | Undulation | No | No | No | No | No | Yes | Yes | Yes |

CE = Comparative Example

TABLE 8

|  |  | Example 6 | Example 7 | Example 8 | Comparative Example 4 | Comparative Example 5 |
|---|---|---|---|---|---|---|
| Thickness | Average thickness (μm) | 110.2 | 110.6 | 78.7 | 110.3 | 79.3 |
|  | Thickness nonuniformities (%) | <±1.0 | <±1.0 | <±1.0 | ±8.9 | ±10.8 |
| Retardation | Retardation nonuniformities (%) | — | — | <±1.0 | — | ±15.4 |
|  | Slow axis nonuniformities (°) | — | — | <±1.0 | — | ±3.7 |
| Outward Appearance | Damage | No | No | No | Yes | Yes |
|  | Wrinkles | No | No | No | Yes | Yes |
|  | Undulation | No | No | No | Yes | Yes |

TABLE 9

|  |  | Example 9 | Example 10 | Example 11 | Comparative Example 2 |
|---|---|---|---|---|---|
| Thickness | Average thickness (μm) | 84.0 | 84.1 | 84.0 | 80.0 |
|  | Thickness nonuniformities (%) | <±1.0 | <±1.0 | <±1.0 | ±2.5 |
| Retardation | Retardation nonuniformities (%) | <±1.0 | <±1.0 | <±1.0 | ±3.0 |
|  | Slow axis nonuniformities (°) | <±1.0 | <±1.0 | <±1.0 | ±2.0 |
| Outward Appearance | Damage | No | No | No | Yes |
|  | Wrinkles | No | No | No | Yes |
|  | Undulation | No | No | No | Yes |

BRIEF DESCRIPTION OF THE DRAWINGS

FIG. 1 is a cross-sectional view showing the mandrel according to the present invention;

FIG. 2 is a cross-sectional view showing the mandrel according to the present invention;

FIG. 3 is a cross-sectional view showing the mandrel according to the present invention;

FIG. 4 is a schematic diagram showing the manner in which the guide part of the mandrel advances;

FIG. 5 is a diagram showing an example in which the resin film is guided by the mandrel;

FIG. 6 is a schematic diagram showing an example of the tubular resin film production apparatus of the present invention;

FIG. 7 is a diagram showing an example of a film production apparatus having internal pressure adjustment means;

FIG. 8 is a diagram showing and example of using the mandrel in the extrusion-molding step;

FIG. 9 is a diagram showing an example of using the mandrel in the stretching step;

FIG. 10 is a diagram showing an example of using the mandrel in the stretching step;

FIG. 11 is a diagram showing an example of using the mandrel in the stretching step;

FIG. 12 is a diagram showing an example of using the mandrel in the stretching step;

FIG. 13 is a diagram showing an example of using the mandrel to hold the resin film during the cutting step;

FIG. 14 is a diagram showing an example of using the mandrel to hold the resin film during the cutting step;

FIG. 15 is a diagram showing an example of using the mandrel in the molding step;

FIG. 16 is a schematic diagram showing another example of the tubular resin film production apparatus of the present invention; and FIG. 17 is a schematic diagram showing another example of the tubular resin film production apparatus of the present invention.

| KEY | |
|---|---|
| 1 | Heating extruder |
| 2 | Core member |
| 3 | Metal cap |
| 7 | Mandrel |
| 8 | Cutting member |
| 71 | Mandrel main body |
| 71b | Opening |
| 72 | Guide part |
| 72a | Edge |
| 74 | Fluid retention part |
| 74a | First space |
| 74b | Second space |
| 75 | Fluid supply and drainage part |
| 100 | Tubular resin film production apparatus |
| L | Deformation restricting part |
| R | Fluid seepage means |

The invention claimed is:

1. A mandrel that comes into proximity or contact with the surface of a moving resin film to guide the movement of the resin film when a resin film in continuous form is continuously produced, the mandrel comprising:
a mandrel main body having an opening, the opening defining an internal space and a fluid retention part; and
a guide part that is composed of an elastic member attached to the opening and having a plurality of pores, and that can advance and retract relative to the resin film, wherein
an internal space is formed between the guide part and the mandrel main body, and fluid seepage means is provided in the internal space so as to allow fluid to seep out through the side facing the internal space via the pores,
a fluid supply and drainage part for supplying the fluid to the fluid retention part or for draining the fluid from the fluid retention part,
the fluid retention part is partitioned by a partitioning wall into a first space communicated with the fluid supply and drainage part and a second space communicated with the pores in the guide part, and
a communicating part for communicating the first space with the second space is provided along the extending direction of the partitioning wall to the partitioning wall.

2. The mandrel according to claim 1, wherein the pores are formed by configuring the guide part from a porous material.

3. The mandrel according to claim 1, wherein,
the fluid retention part constituting the fluid seepage means is provided in the internal space; and
the advance and retraction deformation of the guide part is controlled by adjusting the pressure of the fluid retained in the fluid retention part.

4. The mandrel according to claim 1, wherein, in the region where the guide part and the mandrel main body connect, the edges of the guide part are each held on both sides by a first holding part and a second holding part formed parallel to each other on the mandrel main body.

5. The mandrel according to claim 1, further comprising a deformation restricting part that extends between the side of the mandrel main body and the guide part and restricts the ability of the guide part to deform in a protruding shape past a specific amount.

6. The mandrel according to claim 1, further comprising a temperature adjustment device for heating or cooling the guide part.

7. The mandrel according to the claim 1, wherein the guide part is attached to the mandrel main body so as to constitute an external peripheral surface of a cylindrical shape of an internal peripheral surface of a cylindrical shape.

8. An extrusion-molding device for a tubular resin film wherein the mandrel according to claim 1 is used at the site of at least one part selected from:
a molding part for molding a thermoplastic resin into a tubular resin film after the resin is extruded into a tube shape from a metal cap in a heating extruder;
a cooling part for cooling the molded tubular resin film;
a conveying part for winding up the cooled tubular resin film at a constant speed; and
a holding part for holding the shape of the cooled tubular resin film.

9. A mandrel that comes into proximity or contact with the surface of a moving resin film to guide the movement of the resin film when a resin film in continuous form is continuously produced, the mandrel comprising:
a mandrel main body having an opening, the opening defining an internal space and a fluid retention part; and
a guide part that is composed of an elastic member attached to the opening and having a plurality of pores, and that can advance and retract relative to the resin film, wherein
an internal space is formed between the guide part and the mandrel main body, and fluid seepage means is provided in the internal space so as to allow fluid to seep out through the side facing the internal space via the pores,
in the region where the guide part and the mandrel main body connect, the edges of the guide part are each held on both sides by a first holding part and a second holding part formed parallel to each other on the mandrel main body.

10. The mandrel according to claim 9, wherein the pores are formed by configuring the guide part from a porous material.

11. The mandrel according to claim 9, wherein
a fluid retention part constituting the fluid seepage means is provided in the internal space; and
the advance and retraction deformation of the guide part is controlled by adjusting the pressure of the fluid retained in the fluid retention part.

12. The mandrel according to claim 9, wherein
the mandrel main body comprises a fluid supply and drainage part for supplying the fluid to the fluid retention part or for draining the fluid from the fluid retention part; and
the fluid retention part is partitioned by a portioning wall into a first space communicated with the fluid supply and drainage part and a second space communicated with the pores in the guide part; and
a communicating part for communicating the first space with the second space is provided along the extending direction of the portioning wall to the portioning wall.

13. The mandrel according to claim 9, further comprising a deformation restricting part that extends between the side of the mandrel main body and the guide part and restricts the ability of the guide part to deform in a protruding shape past a specific amount.

14. The mandrel according to claim 9, further comprising a temperature adjustment device for heating or cooling the guide part.

15. The mandrel according to claim 9, wherein the guide part is attached to the mandrel main body so as to constitute an external peripheral surface of a cylindrical shape or an internal peripheral surface of a cylindrical shape.

16. An extrusion-molding device for a tubular resin film wherein the mandrel according to claim 9 is used at the site of at least one part selected from:
a molding part for molding a thermoplastic resin into a tubular resin film after the resin is extruded into a tube shape from a metal cap in a heating extruder;
a cooling part for cooling the molded tubular resin film;
a conveying part for winding up the cooled tubular resin film at a constant speed; and
a holding part for holding the shape of the cooled tubular resin film.

* * * * *